United States Patent

Meade et al.

[15] 3,681,763

[45] Aug. 1, 1972

[54] SEMICONDUCTOR ORTHOGONAL MEMORY SYSTEMS

[72] Inventors: Robert M. Meade, Wassaic; Richard H. Robinson, Wappingers Falls, both of N.Y.

[73] Assignee: Cogar Corporation, Wappingers Falls, N.Y.

[22] Filed: May 1, 1970

[21] Appl. No.: 33,603

[52] U.S. Cl. ..........................340/173, 340/173 FF

[51] Int. Cl. ..........................................G11c 5/02

[58] Field of Search................340/172.5; 34/173 FF

[56] References Cited

UNITED STATES PATENTS

| | | | |
|---|---|---|---|
| 3,525,986 | 8/1970 | Raymond | 340/172.5 |
| 3,466,611 | 9/1969 | Weinberger | 340/172.5 |
| 3,334,336 | 8/1967 | Koerner et al. | 340/172.5 |
| 3,332,067 | 7/1967 | Bacon | 340/172.5 |
| 3,320,592 | 5/1967 | Rogers et al. | 340/172.5 |
| 3,277,449 | 10/1966 | Shooman | 340/172.5 |
| 3,245,052 | 4/1966 | Lewin | 340/172.5 |

*Primary Examiner*—Robert L. Griffin
*Assistant Examiner*—Barry Leibowitz
*Attorney*—Harry M. Weiss

[57] ABSTRACT

A semiconductor orthogonal memory system in which a grid of row and column chip select conductors, and a grid of row and column data conductors, are coupled to an array of memory modules. Common address bits are extended to all modules. The memory is several (eight, in the illustrative embodiment) times faster than the processor with which it operates, and accordingly three of the address bits are cycled during each read or write processor operation. This results in a sequence of eight bits on each row or column data conductor; the number of utilizable bit storage locations in each module is thus increased by a factor of 64. Each module can include several chips, each of which may be divided into multiple segments. In the case of two chips, and two segments per chip, the same number segment in the same number chip in all modules of the selected row or column of modules can be identified by doubling the number of chip select conductors otherwise required and by utilizing one of the address bits to distinguish between the two segments on each chip. This technique increases the number of utilizable bit storage locations in each module to 256. The overall arrangement allows the number of bits in an orthogonal word to be significantly greater than the number of bits in a normal word, without requiring wire linking of the entire bit-storage array and without requiring the array as a whole to be dimensioned to match the entire orthogonal memory.

93 Claims, 11 Drawing Figures

INVENTORS
ROBERT M. MEADE
RICHARD H. ROBINSON
BY
Amster & Rothstein
ATTORNEYS

SEMICONDUCTOR ORTHOGONAL MEMORY SYSTEMS

This invention relates to orthogonal memory systems, and more particularly to semiconductor orthogonal memory systems.

A magnetic core or semiconductor memory array is generally conceived of as a series of "horizontal" words having successive addresses numbered from top to bottom. (The manner in which the memory is conceived of may have little physical relationship to the manner in which it is actually constructed, but analyzing memories as they are generally thought of will facilitate an understanding of the present invention.) The bits in each word may be numbered from right to left. The bits appear in columns, with the rightmost column being the first, the adjacent column being the second, etc. A memory is generally operated upon (to read or write a word) by identifying a row (word) number or address. There is generally no need to identify a particular column (bit number in any word) as far as the memory itself is concerned, although once a word is retrieved from the memory and placed in the arithmetic unit of a computer a particular bit in the word may be operated upon.

However, some thought has been given in the past to operating on column "words" in a memory. In such a case, for example, the fifth column of bits in the memory might be read or written (corresponding to the fifth bit in each row word). A memory system in which column words, as well as row words, can be operated upon is referred to as an orthogonal memory system. When operating in the normal mode, the memory operates as does a conventional memory. But when operating in the orthogonal mode, a column word is operated upon.

A small orthogonal memory might consist of 512 rows and 32 columns (a total of 16,384 bits). When a "normal" word is operated upon, the 32 bits in one of the 512 rows are read out of the memory or a 32-bit word is written into the memory in one of the 512 rows. When an "orthogonal" word is operated upon, a 512-bit word from one of the 32 columns is read out of the memory, or a 512-bit word is written in one of the 32 columns of the memory. In many applications, orthogonal processing can be a very powerful tool. For example, suppose that in some application it is necessary to change to a 0 the lowest order bit in each of 512 normal words. If the computer is capable of performing operations only on normal words, each of the 512 words must be operated upon in succession, with its lowest order bit being changed to a 0 if it was previously a 1. Altogether, 512 cycles of operation are required. On the other hand, if the system can operate in the orthogonal mode, all that is required is to operate upon the rightmost 512-bit orthogonal word, by changing all bits in the word to 0's. Instead of 512 cycles of operation, only one is required. The use and organization of orthogonal memories is described in U.S. Pat. No. 3,277,449 issued to W. Shooman on Oct. 4, 1966, and an article entitled "Associative Processing for General Purpose Computers Through the Use of Modified Memories" by Harold S. Stone, appearing in the proceedings of the Fall Joint Computer Conference, 1968.

Although the principles and advantages of orthogonal memories have been the subject of some prior art theoretical work, orthogonal memories have not been exploited commercially to any significant extent. One of the main reasons for this relates to the difficulty in gaining access at the same time to all of the bits comprising either a normal word or an orthogonal word.

Several methods have been proposed for designing magnetic core (or other devices selected by coincident currents) memories which are capable of operating in both normal and orthogonal modes. One approach is to provide a 2D memory in which the X and Y conductors can be switched between drivers and sense amplifiers. To read a normal word, the selected X conductor is driven and all of the Y conductors are connected to respective sense amplifiers; to read an orthogonal word, the selected Y conductor is driven and all of the X conductors are connected to respective sense amplifiers. To write a word in either mode, either a single X or Y conductor is driven, and all of the perpendicular conductors are driven in accordance with the respective bits to be stored in the normal or orthogonal word. Another approach is simply to duplicate the windings so that there is no need to switch the conductors between drivers and sense amplifiers.

In systems of both of these types, the wires link the entire bit-storage array. Furthermore, the array as a whole must be dimensioned to match the entire orthogonal memory.

The Stone article discloses a different arrangement. A series of bit planes is provided, each of which has a single sense winding coupled to all cores in the plane. A single set of X drivers is provided for all planes. A separate set of Y drivers is required for each plane. Since only a single bit can be read from or written into a bit plane at any time, it is clear that all of the bits in any normal word must be in different bit planes, and all of the bits in any orthogonal word must similarly be in different bit planes. As described in the Stone article, to write a normal word into the array one of the X drivers is operated and the same number Y driver in each set is similarly operated. However, to write an orthogonal word into the memory, at the same time that one of the X drivers is operated a different number Y driver in each set of Y drivers is operated. This is due to the face that if the bit locations in all bit planes are numbered alike, while the same number bit locations in all planes must be identified to write a normal word, different bit locations in all planes must be identified to write an orthogonal word.

In the Stone arrangement, the wires do not link the entire array as in the memories described above. For example, the wires from each set of Y drivers are coupled only to the cores in a respective bit plane. However, the Stone bit planes must still be dimensioned to match the orthogonal memory. For example, the number of planes must equal the number of bits in a normal word.

Furthermore, the number of bit locations in the Y direction in each bit plane cannot exceed the number of bit planes since the maximum number of bits which can be read out of the array is equal to the number of bit planes. This means that an orthogonal word can be no longer than a normal word, and one of the most important features of orthogonal processing cannot be realized.

Even more severe problems are encountered when it is attempted to design an orthogonal memory utilizing semiconductor chips. A typical semiconductor memory includes many chips each of which contains perhaps several hundred bit storage locations. Consider a chip containing 256 such locations and which is capable of reading the value of the single bit in an identified location or writing a bit into this location. It is apparent that no chip can include more than one bit in any word, if all bits in a single word are to be read out of the memory or written into it simultaneously, since only one bit location on any chip can be operated upon at the same time. In a "normal - only" memory this is no drawback. For example, consider a memory containing 256 words each having 32 bits. If 32 256-bit chips are utilized, bit locations 1 in all 32 chips can be assigned to word 1. A single bit can be read from each chip or written into it — all at the same time — in order to operate upon the first 32-bit word in the memory. Similarly, the second bit locations of all chips may be assigned to the second 32-bit word. To operate upon this second word; only one bit must be read from or written into each chip. In this manner, only 32 256-bit chips are required in the memory, with every one of the 256 bits in each chip being assigned to a different normal word.

Suppose that it is desired to design an orthogonal memory using these same chips in which wires do not link the entire bit-storage array. Since only one bit in each ship can be operated upon at any time, it would appear that the Stone arrangement could be utilized with each chip corresponding to a single bit plane. This is feasible. However, as in the Stone system, the orthogonal words can be no longer than the normal words.

Furthermore, with certain types of semiconductor chips the Stone arrangement cannot be utilized. There are two general types of semiconductor chips. In one, the bit storage elements and the wiring grid connecting them in an array correspond to those found in a magnetic core array. If this type of chip is utilized in the Stone arrangement, it is possible to operate upon an orthogonal word by driving a different number Y conductor on each chip (corresponding to driving a different number Y conductor on each of the bit planes in the Stone arrangement). But in the second type of semiconductor chip, the input conductors are not extended through the chips in the form of a grid. A grid is provided to link the bit storage elements, but the conductors in the grid are connected to a decoder on the chip. Depending on the input address, a particular X conductor on the chip and a particular Y conductor on the chip are driven in order to select a particular bit storage element. In a semiconductor memory utilizing chips of this type, the same address is extended to all chips in a selected group. This means that the same number bit storage element in each of these chips is identified. Thus chips of this type cannot be used in a semiconductor orthogonal memory designed in accordance with the Stone teaching because it is not possible to identify different bit storage locations on each chip (bit plane) when operating in the orthogonal mode.

It is a general object of our invention to provide an orthogonal memory system which does not suffer from the disadvantages of the prior art orthogonal memory systems.

More specific objects of our invention are to provide an orthogonal memory system in which the number of bits in an orthogonal word can exceed the number of bits in a normal word, the access wires need not link the entire bit-storage array, and the array as a whole need not be dimensioned to match the entire orthogonal memory (thereby allowing relatively simple wiring and great flexibility in design).

It is another object of our invention to provide such an orthogonal memory system which is capable of utilizing semiconductor chips which include decoding circuitry on them, the same address bits being extended to all chips in common.

Generally, semiconductor memory systems are much faster than the processors with which they operate. Thus, it may be possible to read or write several sets of bits in a semiconductor memory system at the same time that the processor with which it functions performs a single read or write operation.

It is another object of our invention to provide a semiconductor orthogonal memory system in which full normal and orthogonal words are read or written in a number of steps during any processor read or write cycle, the multiple operations of the memory system during any processor cycle facilitating maximum utilization of chip capacities.

The illustrative embodiment of our invention can be understood by visualizing a series of vertical module select conductors and another series of horizontal module select conductors. These two sets of mutually perpendicular conductors form a matrix of "boxes". Within each box there is situated a semiconductor memory module. By energizing one of the vertical module select conductors a column of modules is identified, and by energizing one of horizontal module select conductors a row of modules is identified. There is similarly provided two mutually perpendicular sets of read/write data conductors for reading or writing bits in a selected column of modules or a selected row of modules.

Within each "box" (module), a "small" conductor grid can be visualized, the intersection of each horizontal and vertical conductor in this small grid representing a bit storage location. The same address conductors are extended to each of the modules, and thus the same bit storage locations in all modules are identified. However, even though the same number bit location is identified in every module, by selecting a particular column of modules or a particular row of modules, while at the same time utilizing the row or the column data conductors, it is possible to operate upon an entire orthogonal word or an entire normal word at the same time.

The decoding takes place on two levels. The first level is external to the modules; a particular column select conductor or a particular row select conductor in the "large" grid is energized. The second level of decoding takes place inside each module, that is, inside each "box" of the matrix defined by the grid of module select conductors.

In the illustrative embodiment of the invention, each of the 2048 normal words is 32 bits in length and each of the 128 orthogonal words is 512 bits in length. It would thus appear that the array would require 32 columns of modules and 2048 rows of modules since thus far it has been assumed that only a single bit can be read from any module in any cycle of operation. It is here, however, that the great speed of semiconductor memories can be utilized. In the illustrative embodiment of the invention, it is assumed that the semiconductor memory can operate eight times as fast as the processor associated with it. As will become apparent below, the address bits extended to each module are cycled during each processor read or write operation so that in actuality eight bits are operated upon in succession in each of the selected modules. While the address bits extended to each of the modules are cycled, the energized vertical or horizontal select conductor in the "large" grid visualized above remains energized. Eight bits in succession appear on each row or column data conductor. In effect, this results in a decrease in the number of first-level (large grid) chip select conductors in each dimension by a factor (8) which is equal to the number of memory system cycles of operation during each processor read or write operation. This in turn allows each module to store 8×8 or 64 bits, rather than only one.

Thus far, the illustrative embodiment of the invention has been described as having a module within each "box" of the large grid defined by the row and column module select conductors. In actuality, each module contains two separate semiconductor chips. Furthermore, each chip is divided into two segments, so that there are four chip segments in each "box" (module) in the large or "loosely-woven" grid defined by the row and column module select conductors. It is necessary to identify the same number segment in each module in a selected row or column of modules. This is achieved by doubling the number of row and column module select conductors (so that each module select conductor is replaced by a pair of chip select conductors), and by utilizing one of the address bits extended to each chip in common to differentiate between the two segments on each chip. This will become apparent below. Organizing the memory in this way allows increased use of the bit storage locations in each chip. Each module contains 4 × 64 or 256 utilizable bit storage locations, and the capacity of the memory can be quadrupled without the use of additional modules.

This type of memory organization allows for great flexibility and relatively simple wiring patterns. The length of each orthogonal word is not limited relative to the length of each normal word. By utilizing two levels of decoding, it is possible to utilize even chips of the type which include internal decoding circuitry. (Of course, the principles of the invention are equally applicable to systems incorporating chips of the type in which all decoding is external. In such a case, instead of extending address bits in common to all modules in the "loosely-woven" grid defined by the row and column modules select conductors, all of the "tightly-woven" matrixes inside the modules could be tied together with the appropriate pair of perpendicular conductors being energized by external drivers.) And by segmenting each module and cycling the common address bits within each cycle of processor operation, it is possible to increase the utilization of the bit capacity of each chip.

Further objects, features and advantages of our invention will become apparent upon a consideration of the following detailed description in conjunction with the drawing, in which.

Figures 9, 10:
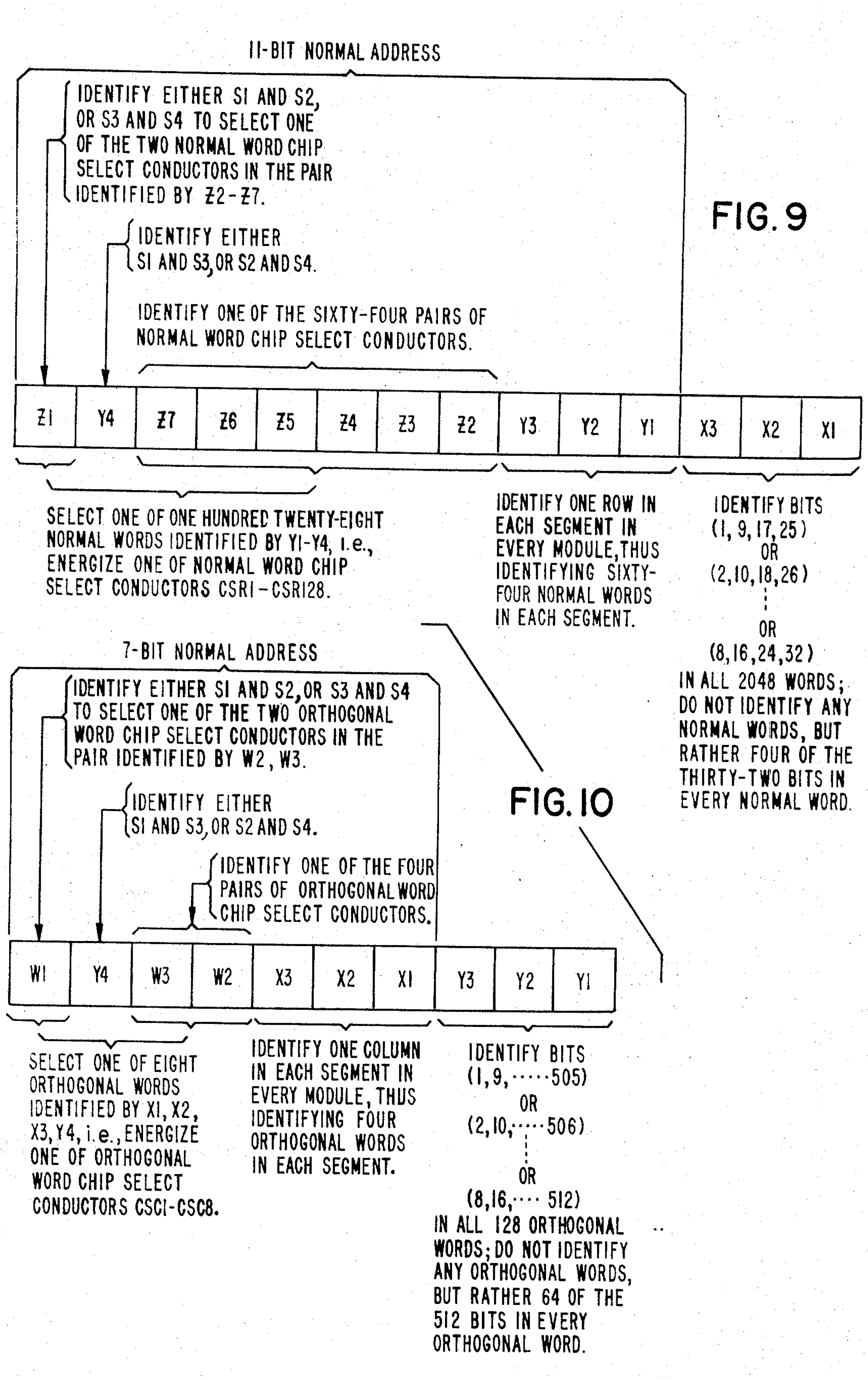

FIG. 9 will be helpful in understanding the function of various address bits in identifying normal words in memory 14; and FIG. 10 will be helpful in identifying the function of various address bits in identifying an orthogonal word in memory 14.

Figure 4:
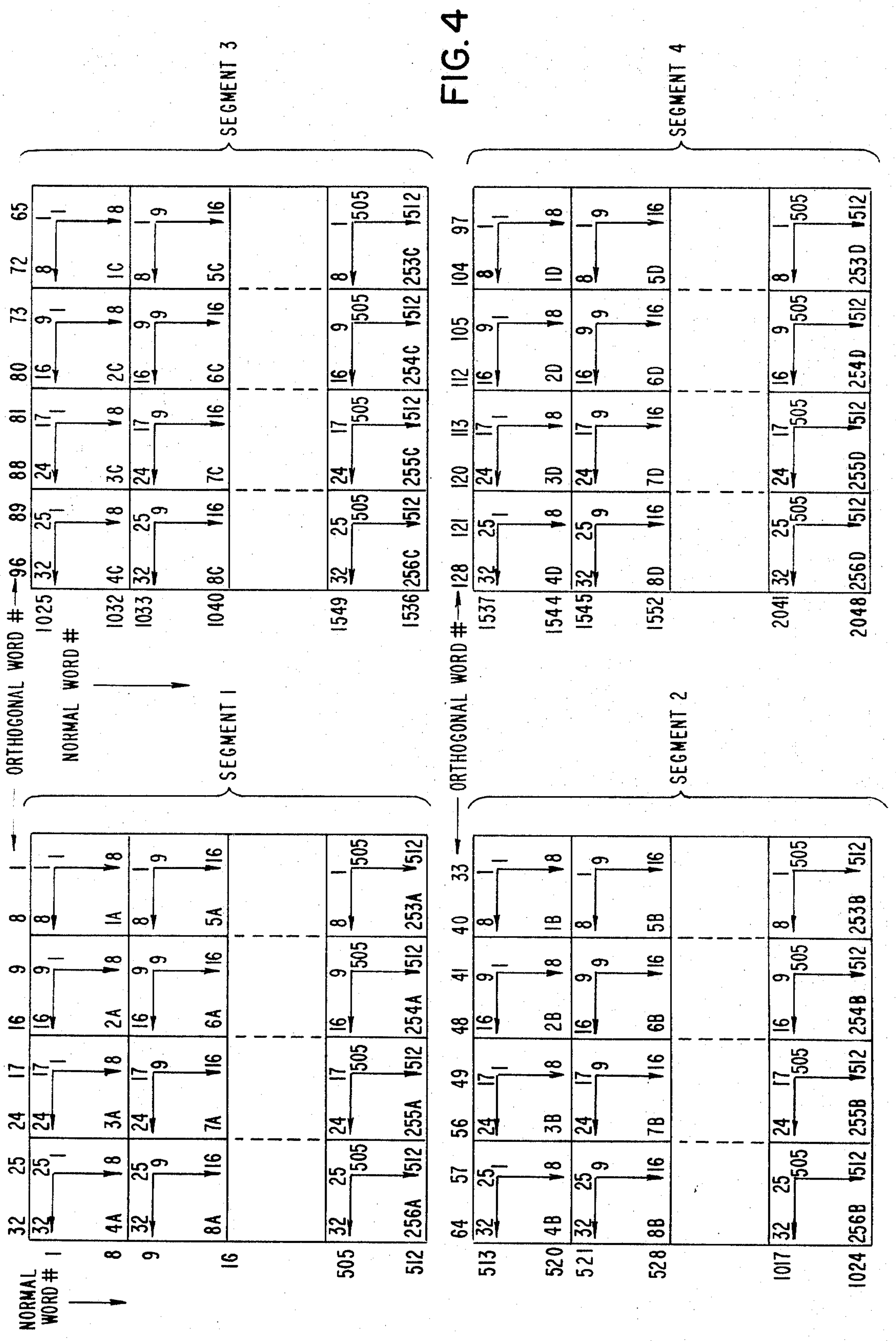

Certain aspects of the organization of the illustrative orthogonal memory are depicted in FIG. 4. The four segments may be visualized as being placed one on tope of the other, with segments 3 and 4 on the right side of the drawing being placed below segment 2 on the left side of the drawing. The bits in the array are organized in 32 columns and 2,048 rows; there are (32) (2,048) or 65,536 bits altogether. The rows are numbered 1–2048, from the top to the bottom of the array. However, the columns are not numbered 1–32 in each segment. Instead, only in segment 1 are the columns so numbered. In segment 2 the columns are numbered 33–64, in segment 3 they are numbered 65–96, and in segment 4 they are numbered 97–128.

Normal words are 32 bits in length. To identify a normal word it is only necessary to identify a row number, e.g., 528. Orthogonal words are identified by a column number. Since there are 2,048 rows altogether, there are 2,048 bits in each of the 32 columns from the top to the bottom of the entire array. In a practical application, there is no need to operate on words of such a great length. It is for this reason that the array is divided into four segments; the 32 columns in each segment contain only 512 bits each. There are thus a total 128 orthogonal words, each identifiable by a respective column number.

A typical semiconductor memory module contains many bits usually organized in a square or rectangular array. It is generally necessary to read (or write) all bits in a normal word or an orthogonal word at the same time. If only a single bit can be read from a semiconductor module at any time, it is apparent that all bits in the module must be contained in different normal and orthogonal words. A basic problem in the design of a semiconductor orthogonal memory is that if standard semiconductor memory modules are used, many of the bits in each module may be "wasted"; no two bits can be included in the same normal word or the same orthogonal word.

In the illustrative embodiment of the invention, however, each module has one-quarter of its total number of bits assigned to each of the four memory segments. Since a normal or an orthogonal word from only one of the four segments is read out at any one time, four times as many bits in a module can be put to use. This can be understood with reference to FIG. 4 if every eight rows are considered as one row and every 8 columns are considered as one column, i.e., every square box in the drawing is thought of as representing one bit only. In such a case, segment 1, for example, would contain 512/8 or 64 rows, and 32/8 or four columns. The entire memory array would consist of 256 modules, with one bit in each respective module "-filling" each of the 256 boxes in segment 1 labeled 1A, 2A, etc. Similarly, one bit of each module would be assigned to segment 2, and another two bits would be assigned to the two segments 3 and 4. Thus four bits on each module could be put into use in the overall array. The four bits in module 25, for example, would be assigned respectively to the lowest order bit of the highest order row and the highest order bit of the lowest order column in each of the segments. This is shown by the numbers 253A–253D in the lower right-hand corner of each segment.

In the case of a very fast memory, it is possible that bits can be read from the memory or written into it much faster than they are required or delivered by a controlling processor. In such a case, in accordance with the principles of our invention, it is possible to allocate the bits on each semiconductor module such that more of them can be contained in each segment. In the illustrative embodiment of the invention, the memory itself is eight times as fast as the processor with which it operates. This means that eight of the memory read or write cycles can take place in a single read or write cycle of the processor. As will now be shown, it is possible to utilize all 256 bits in each semiconductor module.

Each module in FIG. 4 is broken into four parts of 64 bits each, with each 64-bit group being assigned to a different segment. (Conversely, each segment of the memory can be thought of as containing one-quarter of the bits in every module.) Consider just the first quarter of all 256 modules — segment 1. The 64 bits in quarter 1A of module 1 are bits 1–8 in the first eight rows of the segment. The same bits also comprise bits 1–8 of the first eight columns. This is shown by the two arrows in box 1A. The 64 bits in quarter-module 2A comprise bits 9–16 of the first eight rows, and bits 1–8 of columns 9–16. The diagram of FIG. 4 is self-explanatory in view of the bit representations within each box (quarter-module). For example, the 64 bits in the fourth quarter of module 254D comprise the last eight bits (505–512) in each of orthogonal words 105–112, and bits 9–16 in each of normal words 2041–2048.

Suppose the word to be read out of the memory is normal word 505. One bit from each of quarter-modules 253A–256A are read out together, namely, bits 1, 9, 17 and 25 of normal word 505. Immediately thereafter, bits 2, 10, 18 and 26 are read out of the same modules. Another six similar sequences take place until in the eighth sequence bits 8, 16, 24 and 32 are read out together. The 32 bits read out (in a total of eight steps) can then be assembled into a complete word and delivered to the processor together. A total of only four read-out conductors is required for the purpose of reading out normal words; eight bits in succession appear on each conductor.

Suppose, on the other hand, that it is desired to read out orthogonal word 41. In such a case, bits 1, 9 . . . 505 are read out together from quarter-modules 2B, 6B . . . 254B. Altogether, 64 bits are read out at the same time, there being 64 orthogonal read-out conductors. Immediately thereafter, bits 2, 10 . . . 506 are read out from the same modules. This process is carried out eight times until eventually all 512 bits in orthogonal word 41 are available. The 512 bits are then assembled and a complete orthogonal word is delivered to the processor.

In a similar manner, a normal word can be written into the memory on four normal write conductors (the read and write conductors are one and the same in the illustrative embodiment of the invention), and an orthogonal word can be written into the memory on 64 orthogonal write conductors. Because the memory is eight times as fast as the processor, eight bits are delivered in sequence on each read (write) conductor during each processor read (write) cycle.

It is thus apparent that even though only one bit can be read from or written into a module at any time, it is possible to utilize 256 bits in each module in the array. Furthermore, were it possible to read or write $n$ bits in each module at the same time, then $n$ times as many bits in each module could be used in the overall array — the module could be thought of as broken into $n$ parts, in each of which only one bit could be read or only one bit could be written at any one time, with each $1/n$ section of the module divided into four parts corresponding to the four segments. Each module in such a case could contain $256(n)$ bits rather than only 256, and for the same size memory only $256/n$ modules would be required rather than 256.

In general with an organization such as that shown in FIG. 4, a formula can be given for indicating how many bits in each module can be used in the array. The formula is as follows:

(No. of bits per module) = (No. of independent data lines per module)$x$
(No. of memory cycles per system cycle)$^2x$
(No. of segments).

The number of independent data lines is the number of bits which can be written into the memory module or read out from it at the same time. In the illustrative embodiment of the invention, this number is unity. However, in the event that two or more bits can be read or written in any module at the same time, then two or more times as many bits in each module can be used in the memory system. This becomes apparent if, for example, a 4-independent data line module is considered. In such a case, the size of the array of FIG. 4 can be reduced by a factor of four.

As for the second factor in the formula, in the system of FIG. 4 the memory cycle is eight times as fast as the processor (system) cycle. It is thus possible to read (or write) eight bits in each module as a result of each processor command. Since eight bits can be operated upon in succession in either direction, referring to FIG.

4 this gives rise to $(8)^2$ or 64 bits in each module being allocated to each segment.

Finally, the number of bits which can be used in each module is directly dependent upon the number of segments in the memory. Since in any processor cycle, the only bits in each module which are operated upon are those in a single segment of the memory, it is apparent that the total number of 64-bit sections in each module which can be utilized is equal to the total number of segments.

The formula is very useful in the design of a memory system in accordance with the principles of our invention. The system designer generally has available a variety of semiconductor modules to choose from. The number of independent data lines as well as the cycle time of each module are fixed, but vary from module to module. (Generally speaking, the number of segments is fixed in any given application; the number of segments equals the total number of normal words divided by the length of each orthogonal word. Both the total number of normal words and the length of each orthogonal word are generally a system requirement and cannot be varied simply to accommodate the use of a particular semiconductor module. However, even here there may be some flexibility.) With the use of the formula it is possible to select a module for use which meets all requirements. Trade-offs may be made, for example, between connector complexities (No. of independent data lines) and module cost (generally related to cycle time). Each module in the illustrative embodiment of the invention contains 256 bits (two semiconductor chips are included in each module, with each chip having 128 bits). If modules having more than 256 bits are used in the illustrative embodiment of the invention, the excess bits are "wasted" in that they are not used.

Figure 6:
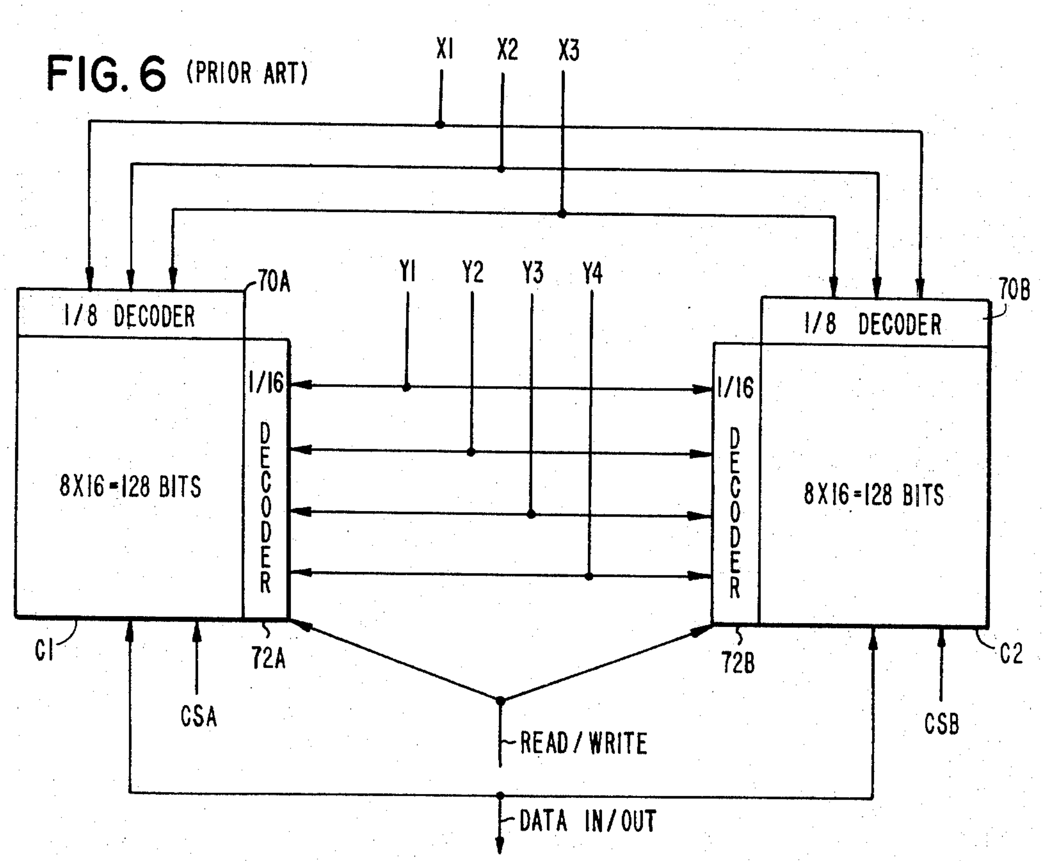
FIG. 6 (PRIOR ART)
FIG. 6 depicts a typical prior art semiconductor 256-bit memory module.
Figure 7:
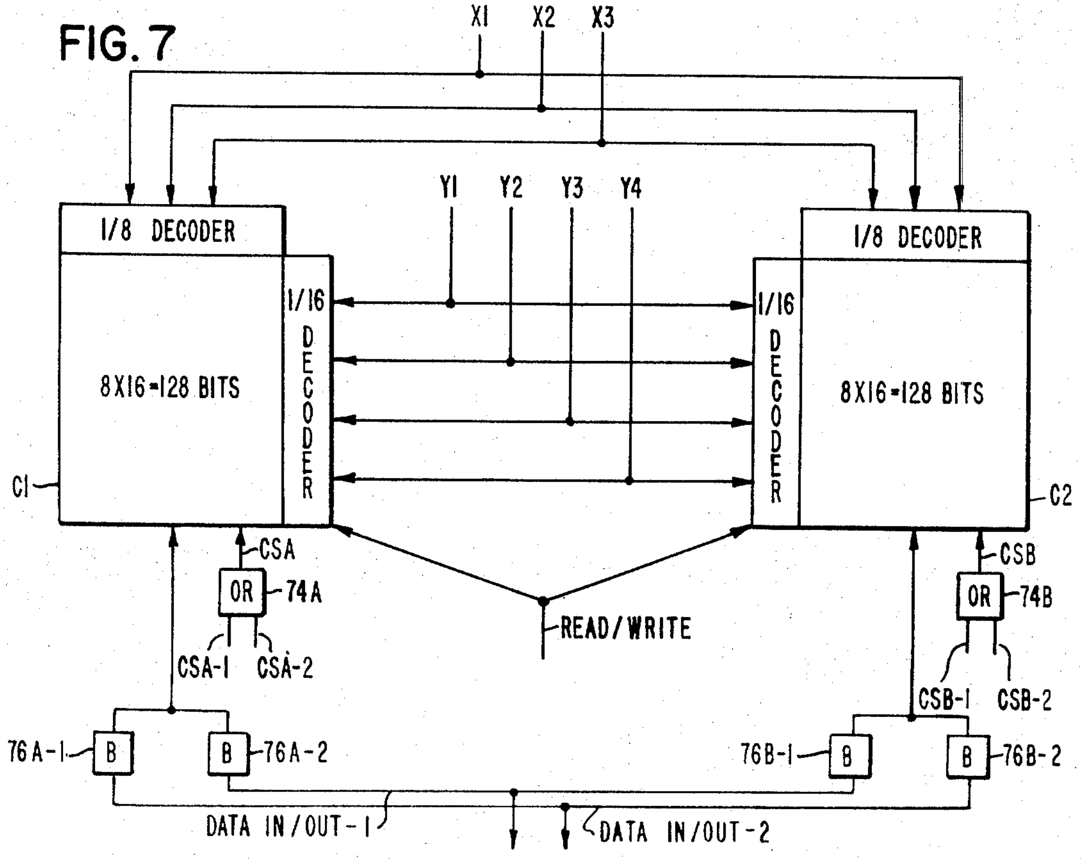
FIG. 7 depicts a manner in which the prior art memory module of FIG. 6 may be modified for incorporation into memory 14 of FIG. 1.

FIG. 6, shows a typical prior art-type 256-bit module. The module used in the illustrative embodiment of the invention, shown in FIG. 7, is only slightly different from that of FIG. 6. The additional transistors required in each module are so few that minimal changes are required in the masks used to make the chips in the prior art module to allow fabrication of the module shown in FIG. 7.

The module of FIG. 6 includes two semiconductor chips C1, C2. Each chip has a pair of decoders and 128 bits arranged in an 8 × 16 array, with the conventional word and bit lines. Address bits X1, X2, X3 are extended to each of the one-out-of-eight decoders 70A, 70B. Each decoder operates to select one of the eight columns in the respective one of chips C1 and C2 depending on the column number identified by the input address bits. Similarly, the four address bits Y1, Y2, Y3, Y4 are extended to each of the one-out-of-16 decoders 72A, 72B. Each of these decoders selects the same number row on its respective chip. In this manner, the same bit address is identified in each of the two chips. To select a single one of the 256 bits in the module, one more step of decoding is necessary, namely, the selection of one of the two chips. Only one of chip select conductors CSA, CSB is energized, depending on the chip which is to be operated upon. No matter what signals appear on any of the other conductors in the module of FIG. 6, no operations take place until one of the two chip select conductors is energized.

The READ/WRITE conductor is extended to both of the chips in the module. Depending on the state of this conductor, a bit is either written into the selected bit address or read out of it. A single DATA IN/OUT conductor is similarly extended to each of the two chips. If the READ/WRITE conductor indicates that a bit is to be written into the module, the bit appearing on the DATA IN/OUT conductor is written into the selected address. On the other hand, if the state of the READ/WRITE conductor indicates that a read operation is to take place, the bit appearing in the selected bit location is read out and appears on the common DATA IN/OUT conductor.

The total number of address bits required to select one of the 256 bit addresses in the module is eight (X1–X3, Y1–Y4, and either CSA or CSB). It should be noted that conductors CSA, CSB together identify what amounts to only a single bit in the overall address. The reason for not using a single conductor whose state (0 or 1) would select either of the two chips is that some signal must be provided to "turn on" selected chips in the array. Conductors X1–X3 and Y1–Y4 may be energized or de-energized (representing 0's or 1's) but they have no effect on a chip until its chip select conductor is energized. Were a single eighth address conductor used instead of the pair of conductors CSA, CSB, it would still be necessary to provide some kind of "turn on" signal to a particular chip in an overall array to inform it that an operation is to be performed at the bit location represented by the eight address bits. Thus two separate conductors CSA, CSB are provided in the module of FIG. 6; the energization of either not only causes a bit to be read from or written into a chip, but the particular one of the two chip select conductors which is energized also serves as the eighth address bit necessary to identify a particular one of the 256 bit locations in the module.

FIG. 7 depicts the module which is used in the illustrative embodiment of the invention. The module is identical to that of FIG. 6 except for the following changes:

1. Chip C1 is still provided with a single chip select conductor CSA. However, chip C1 can be selected by the energization of either chip select conductor CSA-1 or chip select conductor CSA-2. These conductors are connected to the two inputs of OR gate 74A, whose output is extended to conductor CSA. Similarly, chip select conductor CSB is energized when a signal appears on either of conductors CSB-1 or CSB-2. Two separate chip select conductors are provided for each chip; one of them may be energized when a normal word in the overall array is to be operated upon, and the other may be energized when an orthogonal word in the overall array is to be operated upon, as will be described below.

2. Instead of a single DATA IN/OUT conductor extending out of the module, two separate conductors, DATA IN/OUT -1 and DATA IN/OUT -2, are provided. On chip C1, these conductors are connected through respective two-way buffers 76A-1, 76A-2 to the DATA IN/OUT for the chip, and on chip C2 the two conductors are connected through respective two-way buffers 76B-1, 76B-2 to the DATA IN/OUT conductor for the chip A signal on either chip DATA IN/OUT conductor is extended through the two respective buffers to the two module IN/OUT conductors. Similarly, a signal on either of the two module IN/OUT conductors is extended to the DATA IN/OUT conductor on each chip. The purpose of the buffers will become apparent below when the wiring of the overall memory (FIG. 5) is considered. As will be described, each module is coupled to an orthogonal word data bus and a normal word data bus. One of the two sets of buses is used depending upon the mode (normal or orthogonal) in which the memory is operated. The buffers provide the necessary isolation between the four normal data buses and the 64 orthogonal data buses to be described below.

It is important to note that the module of FIG. 7 is little different from the module of FIG. 6. The pair of additional OR gates and the pair of additional buffers require very few changes in the masks used to fabricate the chips. (The OR gates and the buffers can be included on respective chips C1, C2 provided a connection is provided internal or external to the module between the two chips to the two shared DATA IN/OUT conductors.) It should also be noted that three additional pin connections to the module are required (an extra data IN/OUT conductor and two extra chip select conductors). Thus the total number of signal pin connections to each module must be increased from the 11 of FIG. 6 to the 14 shown in FIG. 7.

It should also be borne in mind that each chip need not be an 8 × 16 array. In reality, each chip simply includes 128 bit locations and a decoder circuit capable of identifying one of them depending on the 7 address bits on conductors X1–X3, Y1–Y4. The illustrative embodiment of the invention can be best understood by visualizing each chip as being an 8 × 16 array and having two separate decoders. But there are no physical restrictions concerning the actual organization of a chip. Seven address bits identify a single bit location in a 128-bit chip no matter how the bit locations are organized and no matter how many decoders are used.

Figure 5:
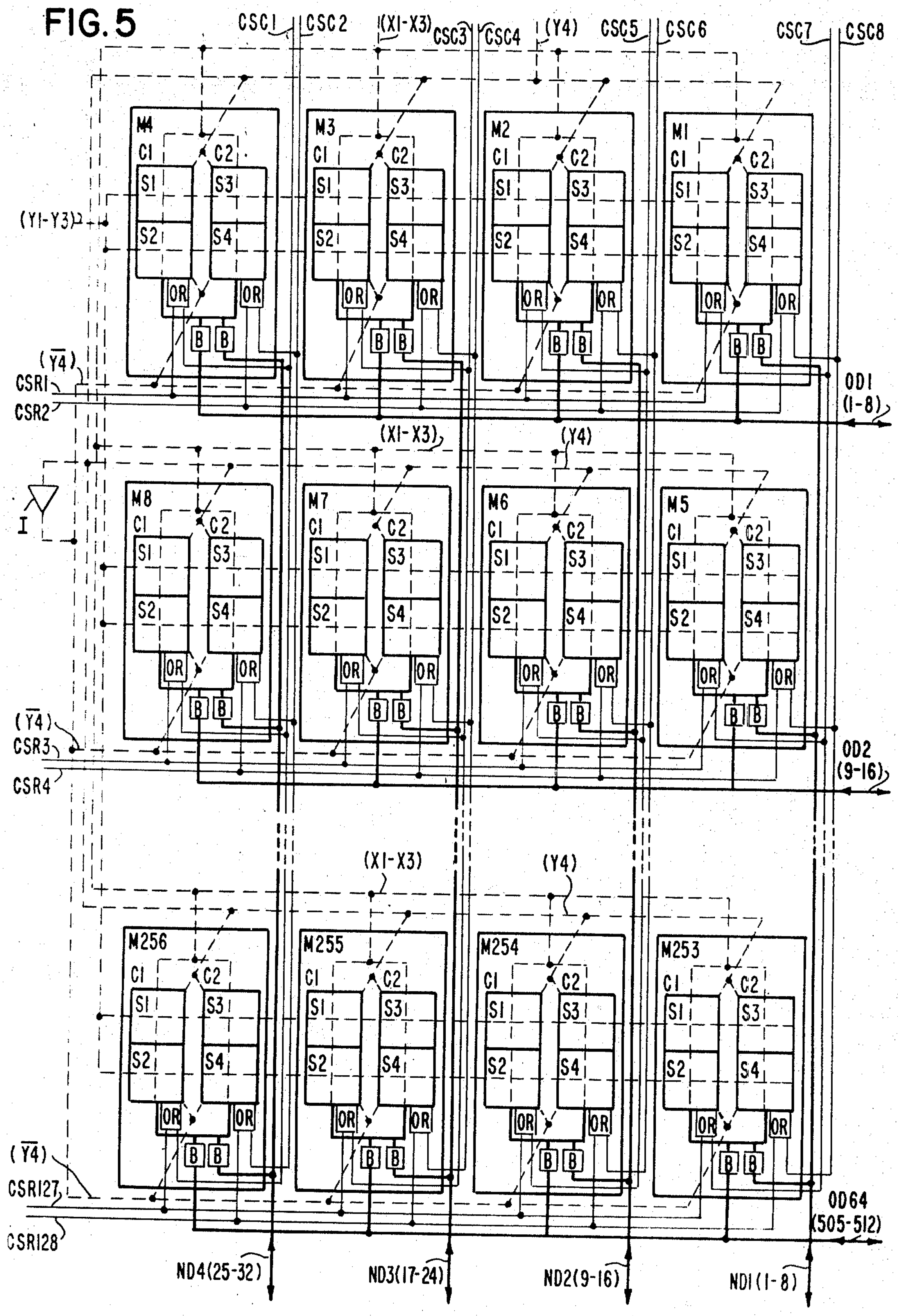

FIG. 5 shows the wiring of the modules in the memory system. The array consists of 256 modules M1–M256. (The modules need not be all included on the same card; in such a case, the individual cards would be interconnected to form an overall wiring diagram such as that depicted in FIG. 5.) The wiring diagram of FIG. 5 itself is symbolic and is to be interpreted as described below.

Modules M1–M256 are arranged in an array similar to the array depicted for any one of segments 1–4 on FIG. 4. Thus, module M1 corresponds to boxes 1A–1D in FIG. 4. Each module includes 2 chips, C1, C2. Chip C1 includes 128 bits, 64 of which are allocated to segment 1 of the memory and 64 of which are allocated to segment 2 of the memory. Similarly, chip C2 includes 128 bits, 64 of which are allocated to segment 3 of the memory and 64 of which are allocated to segment 4 of the memory. In effect, the array of FIG. 5 is the same as the array of FIG. 4, where in the latter figure the four segments are superimposed on each other and each one of the resulting 256 four-level boxes represents a single complete module.

In FIG. 5, address conductors X1–X3 are shown extending down through both chips in each of the 256 modules. Referring to 6 and 7, it will be recalled that address bits X1, X2, X3 identify a particular one of the eight columns in each chip of any module to which they are extended. In the array of FIG. 5, the three address conductors are extended to every module, and consequently the same number column in all 512 chips of the array are identified at the same time.

In the modules of FIGS. 6 and 7, the four address conductors Y1–Y4 identify one of 16 rows in each chip. If each chip is considered to be divided into two eight-row segments, address bits Y1, Y2, Y3 can identify the same number row in each segment; the fourth address bit, Y4, can identify one of the two segments on the chip in order to identify only one of the 16 rows. As shown in FIG. 5, conductors Y1–Y3 extend horizontally through both segments in all chips. Depending on the Y1, Y2, Y3 address bits, the same number rows in all 2,048 chip segments are identified. The fourth address bit (conductor Y4) is shown connected to segments 1 and 3 in all modules. The conductor is also connected to the input of inverter I, whose output is connected to conductor $\overline{\mathbf{Y4}}$. This latter conductor is shown connected to segments 2 and 4 in all modules. This notation and the depiction of the inverter is symbolic only. It is intended to show that if the Y4 address bit is a 1, segments 1 and 3 in each module are identified. Similarly, if address bit Y4 is a 0, conductor Y4 is energized and segments 2 and 4 in each module are identified. By identifying either segments 1 and 3 in each module, or segments 2 and 4, the last level of "Y" decoding on each chip is accomplished. It is to be understood that as shown in FIG. 7, conductors Y1–Y4 are extended to a decoder on each chip, and the four address bits together identify one of the 16 rows on the chip. Two separate conductors Y4 and $\overline{\mathbf{Y4}}$, together with an inverter, are shown on FIG. 5 only because it will be convenient in the analysis below to show the "Y" decoding in two steps — the eight rows in each segment of each chip identified by address bits Y1, Y2, Y3, and the last level of identification determined by address bit Y4.

Thus the seven address bit conductors X1–X3 and Y1–Y4 are extended to every chip in the array. Referring to FIGS. 6 and 7, it will be recalled that the seven address bits identify the same bit location on each of the two chips in a module. Consequently, depending on the particular values of the seven address bits, the same number bit locations are identified in both of segments 1 and 3 in every module, or in both of segments 2 and 4 in every module.

Referring back to FIG. 7, in a particular module although the same bit location is identified in each of the two chips, only one of the two chips is operated upon depending on which of OR gates 74A, 74B is energized. The last level of decoding is determined by which one of the chip select conductors is energized, energization of one of the chip select conductors also enabling a read or write operation depending on the state of the READ/WRITE conductor. (Although not shown in FIG. 5, it is to be understood that the READ/WRITE conductor is extended to each chip in the array.) Two horizontal chip select conductors CSR1, CSR2 are provided for the first row of four modules. Chip select conductor CSR1 is extended to an input of the OR gate associated with chip C1 in each of these four modules. Similarly, chip select conductor CSR2 is connected to an input of the OR gate associated with chip 2 in each of the two modules. If conductor CSR1 is energized, for example, chip C1 in each module in the top row is selected to be operated upon — of the two same-number bit locations in each of modules M1–M4 identified by addressed bits X1–X3 and Y1–Y4, energization of chip select conductor CSR1 causes a read or write operation to be performed at only the location in chip C1.

A similar pair of horizontal chip select conductors is provided for each of the other 64 four-module rows. Of the total of 128 chip select row conductors CSR1–CSR128, only one is energized during any read or write operation.

Chip select column conductors CSC1, CSC2 are provided for the first column of modules. Chip select conductor CSC1 is connected to the second input of the OR gate associated with chip 1 in each of modules M4, M8 . . . M256. Chip select conductor CSC2 is connected to the second input of the OR gate associated with chip 2 in each of these modules. A similar pair of column chip select conductors is associated with each of the other three columns of modules. Of the eight column chip select conductors CSC1–CSC8, only one is energized during any read or write operation.

One of the 128 CSR conductors is energized when the memory system is operated in the normal mode, and one of the eight CSC conductors is energized when the system is operated in the orthogonal mode. One of these conductors is selected at a first level of decoding (external). Conductors X1–X3, Y1–Y4 (also energized externally) result in the energization of two mutually perpendicular conductors on each chip (not shown) to select a particular bit location following a second level of decoding (internal).

Four normal data conductors are shown in FIG. 5, each conductor being connected through a buffer to the DATA IN/OUT conductor in each chip. (Although each module includes four buffers as shown in FIG. 7, for the sake of simplicity only two buffers are shown on each module in FIG. 5; the two buffers serve simply to illustrate the isolation achieved in the actual module.) The four normal data conductors are labeled ND1(1-8), ND2(9-16), ND3(17-24), ND4(25-32). The numbers in parenthesis associated with each column data conductor represent the bits in each normal word which appear on the conductor in succession during any read or write operation. During the first step of each read or write cycle, bits 1, 9, 17, 25 appear on the four respective conductors. During the second step, bits 2, 10, 18, 26 appear on the respective conductors, etc. The four normal data conductors (as well as the orthogonal data conductors to be described below) are shown in heavy lines not because they represent cables but only for the sake of clarity.

Similarly, 64 orthogonal data conductors OD1(1-8) – OD64(505-512) are also provided in the array of FIG. 5. Each orthogonal data conductor is connected through a respective buffer to the DATA IN/OUT conductor in each of the eight chips in the associated row. When an orthogonal word is being read or written, bits 1, 9 . . . 505 appear on the 64 respective orthogonal data conductors during the first step of each cycle. During the second step, bits 2, 10 . . . 506 appear on the conductors, etc.

The array of FIG. 5 exhibits two "weaves," one loose and one tight. Parallel to one axis of the loose weave are conductors CSR1–CSR128 and ND1(1-8)–ND1(25-32). Parallel to the other perpendicular axis are conductors CSC1–CSC8 and OD1(1-8)–OD64(505-512). The tight weave, in each module, includes the row bit select conductors and the column bit/sense lines on the chips themselves (not shown).

Figure 3:
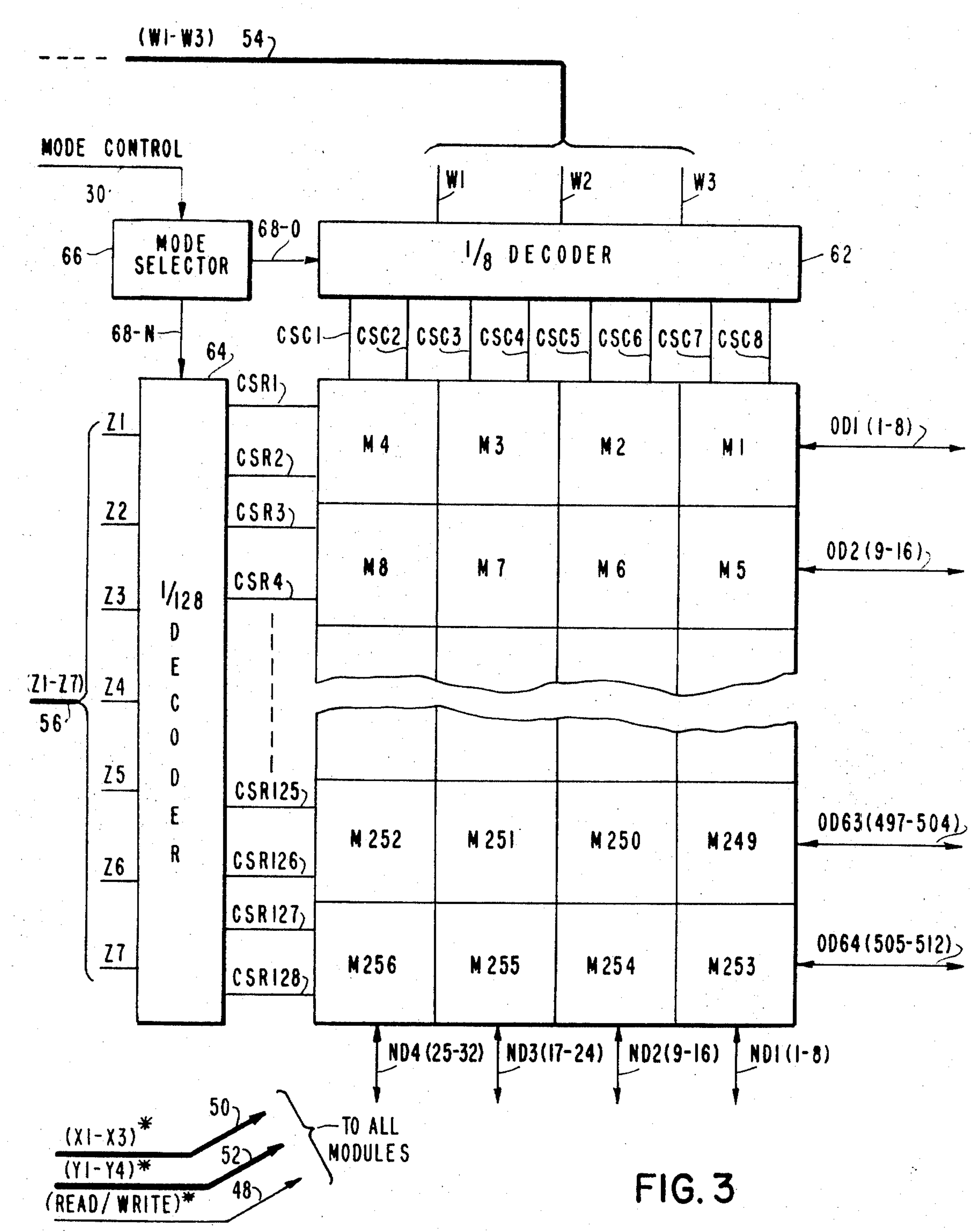
FIGS. 3, 4 and 5 depict different aspects of memory 14 of FIG. 1.

FIG. 3 depicts the memory modules together with all of the address, control and data conductors extended to them. Modules M1–M256 are shown as they are on FIG. 5. The 64 orthogonal data conductors are shown extended to respective rows of modules (each row containing four modules), and the four normal data conductors are shown extended to respective columns of modules (each column containing 64 modules). The 128 normal word chip select conductors CSR1–CSR128 are shown connected between decoder 64 and the module array. A pair of conductors is provided for each row of modules. Decoder 64 energizes only one of the 128 normal word chip select conductors, depending on the address appearing on address conductors Z1–Z7. The seven address bits enable a total of $2^7$ or 128 conductors to be identified. The eight orthogonal chip select conductors CSC1–CSC8 are shown extended between the four columns of modules and decoder 62. A pair of orthogonal chip select conductors is coupled to each column of modules. The three address conductors W1, W2, W3 allow decoder 62 to select one of the $2^3$ or 8 orthogonal chip select conductors.

Decoder 64 operates only when an operation is to be performed on a normal word; decoder 62 operates only when an operation is to be performed on an orthogonal word. A signal, to be described below, is transmitted over mode control conductor 30 to mode selector 66. Depending on the mode (normal or orthogonal) in which the memory system is to operate, one of the conductors -68-O or 68-N is energized. Each of these conductors is extended to a respective one of decoders 62, 64 to enable its operation.

At the bottom of FIG. 3, cables 50, 52 and conductor 48 are indicated as being extended to all 256 modules. Cable 50 contains the three address conductors X1–X3 and cable 52 contains the four address conductors Y1–Y4. Conductor 48 is the READ/WRITE conductor whose state informs all modules whether a read or write operation is to be performed. Conductors X1–X3, Y1–Y4 and the READ/WRITE conductor are labeled with an asterisk (which notation is also used on FIG. 1 to be described below) to indicate that these conductors are extended to every module in the memory system (in fact, to each of the two chips in every module).

With the memory organization as shown in FIGS. 3, 4, 5 and 7, it can be shown that the seven address bits extended to all modules (X1–X3 and Y1–Y4) together with an additional seven address bits Z1–Z7 (which result in the energization of one of the 128 normal word chip select conductors) enable an operation to be performed on any one of the 2,048 normal words in the memory, and that the seven address bits extended to all modules (X1–X3 and Y1–Y4) together with an additional three address bits W1, W2, W3 (which result in the energization of one of the eight orthogonal word chip select conductors) enable an operation to be performed on any one of the 128 orthogonal words in the memory. The manner in which the address bits are derived will be explained below with reference to FIG. 2. Before proceeding to FIG. 2, however, it is necessary to verify that the address bits indeed select normal and orthogonal words as desired.

FIG. 9 depicts the manner in which the address bits identify a normal word. There are 2,048 normal words in the memory system, and an 11-bit address ($2^{11}$= 2,048) is required to identify any one of them. The 11 bits which identify a normal word are Y1–Y4 and Z1–Z7, as shown in FIG. 9. The operation controlled by address bits X1–X3 will be described following a consideration of address bits Y1–Y4 and Z1–Z7.

Referring to FIG. 5, it will be recalled that address bits Y1–Y3 identify one of the eight rows in each segment of every module. Thus with a particular one of the eight possible bit combinations for address bits Y1, Y2, Y3, 64 normal words in each segment are identified. This becomes apparent with reference to FIG. 4. Segment 1 of the overall memory includes the first quarter of each module; there are thus 64 rows of quarter-modules. Since one row in each quarter-module is identified, 64 normal words in all are identified by bits Y1–Y3. Similarly, 64 normal words are identified in each of the other three segments. For example, if bits Y1–Y3 represent the number 5, then since the three address conductors are extended to each module, they identify normal words 5, 13 . . . 509 in segment 1; normal words 517, 525, . . . 1,021 in segment 2; etc.

Referring to FIG. 5, it will be recalled that address bit Y4 identifies either segments 1 and 3, or segments 2 and 4. Depending on the value of address bit Y4, the normal words in only two of the four segments remain "in the running" for selection, a total of 128 normal words.

One of these 128 words is selected by address bits Z1–Z7; decoder 64 causes one of normal word chip select conductors CSR1–CSR128 to be energized. Address bit Z1 is shown as identifying either segments 1 and 2 or segments 3 and 4. This highest-order bit of the seven-bit Z1–Z7 address limits the selection to one of the two segments identified by bit Y4. Bits Z2–Z7 identify a particular pair of conductors CSR1 and CSR2, or CSR3 and CSR4, etc. Bit Z1 identifies a particular one of the two conductors in the selected pair.

The important point to note is that the four address bits Y1–Y4 simply identify one of the eight rows in only two of the four segments in each module. Bits Z1–Z7, by controlling the energization of only one of normal word chip select conductors CSR1–CSR128, not only identify only one of the 64 rows of modules, but further (in accordance with the value of Z1) select only one of the two segments identified in these four modules by bit Y4. It should also be noted that of the 11 bits in each normal word address, seven of them (Z1–Z7) are decoded outside of the modules in decoder 64, while four of them are extended to each module and decoded internally.

It must be recognized that an 11-bit binary address can identify decimal addresses 0 through 2047, while the normal words are numbered 1 through 2048 in FIG. 4. Thus, when considering the identification of any normal word by the 11-bit normal address, the value of unity must be added to the address represented by the binary number to arrive at the associated word address in FIG. 4. (This is merely a matter of notation; the normal word addresses could be numbered 0 through 2047 in FIG. 4. Similar remarks apply to binary row and column bit identifications.)

Any normal word 11-bit address can be thought of as the sum of selected ones of components $2^{10}, 2^9 \ldots 2^0$. All addresses in segments 3 and 4 have the component $2^{10}$ while none of the addresses in segments 1 and 2 have this component. Consequently, Z1, the most significant bit in the 11-bit normal word address, is used to identify segments 1 and 2, or segments 3 and 4. It is the Z1 bit which causes decoder 64 to energize either one of the odd-numbered normal word chip select conductors or one of the even-numbered normal word chip select conductors. In other words, decoder 64 examines bits Z2–Z7 to identify a particular pair of normal word chip select conductors such as CSR1 and CSR2, or CSR3 and CSR4, etc. The most significant bit in the address, Z1, causes the decoder to energize the odd number conductor in the selected pair for an address in segments 1 or 2, and the even number conductor in the selected pair for an address in segments 3 or 4.

Bit Y4, since it is in the tenth position of the address, can contribute a component of $2^9$ or 512 to any address. If bit Z1 identifies segments 1 and 2, it is still necessary to identify the particular one of these two segments which contains the selected word. Since all addresses in segment 2 are greater than corresponding addresses in segment 1 by the value 512, it is apparent that bit Y4 distinguishes between addresses in segments 1 and 2. Similarly, if bit Z1 identifies segments 3 and 4, since all addresses in segment 4 are greater than the corresponding addresses in segment 3 by 512, bit Y4 can identify a word address in segment 4 as distinguished from a corresponding word address in segment 3.

Bits Z2–Z7 cause decoder 64 to select one of the 64 pairs of normal word chip select conductors. A pair of these conductors is extended to each row of modules. If the lowest order pair (CSR1, CSR2) is selected, the first row of modules is identified. The six bits Z2–Z7 (where Z7 is the most significant of these), depending on their values, contribute components to the total address in increments of 8; since they are contained in bit positions 4–9 of the address, they can contribute components to the total address of 0, 8, 16 . . . 504. This in turn corresponds to addresses 1, 9 . . . 505 in segment 1 (if Z1 and Y4 are both 0's); addresses 513, 521 . . . 1017 in segment 2 (if Z1 is a 0 and Y4 is a 1); addresses 1025, 1033 . . . 1549 in segment 3 (if Z1 is 1 and Y4 is 0); and addresses 1537, 1545 . . . 2041 in segment 4 (if Z1 and Y4 are both 1's).

Finally, bits Y1, Y2, Y3 add a component of 0, 1 . . . 7 to each address and thus cause a particular address in each address multiple of 8 to be identified.

As a particular example, consider the binary address (with the most significant bit being to the left) 10000010010. This address, as a sum of its binary components, is $1(2^{10}) + 0(2^9) + 0(2^8) + 0(2^7) + 0(2^6) + 0(2^5) + 1(2^4) + 0(2^3) + 0(2^2) + 1(2^1) + 0(2^0) = 1042$. Recalling that each binary address corresponds to a word address greater by the value of unity, the identified normal word has address 1043. It will now be shown that this is indeed the word selected.

Bit Z1(a 1) causes segments 3 and 4 to be identified. Bit Y4 limits the selection to segment 3 since it is a 0. Bits Z2–Z7 (000010) decode to a value of 2 and thus identify the third pair of normal word chip select conductors CSR5, CSR6 (the decoded addresses represented by bits Z2–Z7, namely, addresses 0–63, correspond to conductor pairs CSR1,CSR2 through CSR127, CSR128), i.e., they identify the third row of quarter-modules in segment 3 (the row containing normal words 1041 through 1048). Finally, address bits Y1–Y3 (010) represent the number 2, or a word address component of 3 since the numbers 0–7 represented by the three-bit address component represents rows 1–8 in each segment. The third word in the third row of quarter-modules in segment 3 thus identified is the word having normal address 1043, the same number represented by the 11-bit normal address (when increased by unity).

Once this word is selected, 32 bits must be read out of the memory or written into it. Although only four normal data conductors ND1 through ND4 are provided, each of these conductors is used to transmit eight bits in succession. The three address bits X1, X2, X3 identify a particular one of the eight columns in each segment in every module. The processor causes the 11-bit normal address to appear on conductors Y1–Y4 and Z1–Z7 throughout the read or write cycle. While the address appears on the 11 address conductors, bits X1, X2, X3 are cycled. Initially the three bits represent 000 and identify the rightmost column in each segment in each chip. Consequently, the rightmost bit in the selected row of each of the four selected quarter-modules appears on the respective one of the four normal data conductors as it is read out of or written into the memory. Thus, bits 1, 9, 17 and 25 of the selected normal word are first operated upon. Immediately thereafter, bits X1, X2, X3 are cycled to the state 001 (representing column 2 since every binary number address is increased by unity to determine the bit number or word number which it represents in the notation of FIG. 4) to identify by the adjacent bit in the selected row of each of these selected quarter-modules. Thus bits 2, 10, 18 and 26 next appear on the four normal data conductors. In a similar manner, address bits X1, X2, X3 are cycled until eventually they represent 111 (representing column 8 in each segment in every chip), and bits 8, 16, 24 and 32 are read out of the array or written into it in the selected word. The manner in which a normal 32-bit word delivered by the processor is broken up into four eight-bit sequences for writing it into the memory, and the manner in which four eight-bit sequences read from the memory are combined to form a complete 32-bit word for delivery to the processor, will be described below with reference to FIGS. 8A, 8B.

FIG. 10 illustrates the manner in which a seven-bit orthogonal address results in the selection of a particular one of the 128 orthogonal words and the appearance of 64 eight-bit sequences on the 64 orthogonal data conductors OD1–OD64. The seven bits of the orthogonal address are directed to conductors X1–X3, W1–W3, Y4 with each of the latter address conductors being assigned to a respective bit in the address as shown in FIG. 10. Thus the least significant bit in the address appears on conductor X1 and the most significant bit in the address appears on conductor W1.

While in the case of a normal word operation, address conductors X1, X2, X3 are used not to identify any normal word but rather to identify four of the 32 bits in every normal word, when an operation is to be performed on an orthogonal word the address bits on conductors X1, X2, X3 identify one column in each segment in every module. Referring to FIG. 5, it will be recalled that conductors X1, X2, X3, extended to every module, identify one out of eight columns in all four segments of every module. The same number column is identified in every segment. Referring to FIG. 4, since a column is identified in each quarter-module, that is, in each "box" in each segment, it is apparent that four orthogonal words in each segment, or a total of 16 orthogonal words, are identified by the three least significant bits in the seven-bit orthogonal address.

The sixth most significant bit in the orthogonal address appears on address conductor Y4 and, as depicted in FIG. 5, identifies either segments 1 and 3, or segments 2 and 4, in every module.

Finally, bits 4, 5 and 7 in the orthogonal address appear on respective address conductors W2, W3, W1. Since bits X1–X3 identify 16 orthogonal words in the overall array and bit Y4 identifies only two of the four segments, the four bits together identify only eight orthogonal words. The address bits on conductors W1, W2, W3 select one of these remaining eight orthogonal words. As seen in FIG. 3, decoder 62 is enabled when the system operates in the orthogonal mode. The three address bits on conductors W1, W2, W3 result in one of orthogonal word chip select conductors CSC1-CSC8 being energized. The energization of one of these conductors causes the selected orthogonal word to be operated upon.

With respect to the three bits decoded by decoder 62, the most significant, on conductor W1, identifies either segments 1 and 2, or segments 3 and 4. In other words, bits W3, W2 select a pair of the orthogonal word chip select conductors such as CSC1 and CSC2, or CSC3 and CSC4, etc. Bit W1 then determines which of the two conductors in the selected pair is energized. If W1 is a 1, the even number orthogonal word chip select conductor is energized to select segments 3 and 4 in each of the 64 modules coupled to he conductor. On the other hand, if W1 is a 0, the odd number conductor in each pair is energized to select segments 1 and 2 in each of the 64 modules to which it is coupled.

As a specific example, consider the seven-bit orthogonal address 1101111. The three least significant bits in the address (X1, X2, X3) identify the eighth column in each segment of every module (since the column identified by a binary address 7 is the eighth column). Since the sixth most significant bit (Y4) is a 1, segments 2 and 4 are identified. Since the W1, W3, W2 bits in sequence are 101, a binary 5, the sixth chip select column conductor CSC6 is selected. (Bits W3, W2 identify conductor pair CSC5, CSC6, and bit W1 selects conductor CSC6 of the pair.) This conductor, the even number conductor in pair CSC5, CSC6, identifies segments 3 and 4 in modules M2, M6 . . . M254. Since bit Y4 identifies segments 2 and 4 and bit W1 identifies segments 3 and 4, the segment which is selected is segment 4; word chip select conductor CSC6 selects quarter-modules 2D, 6D . . . 254D in segment 4 of FIG. 4, which quarter-modules contain orthogonal words 105–112. Finally, since bits X1, X2, X3 identify the eighth word of these eight words, the seven-bit orthogonal address causes orthogonal word 112 to be selected.

This can be verified as follows. The decimal equivalent of the binary address 110111 is $1(2^6) + 1(2^5) + 0(2^4) + 1(b\ 2^3) + 1(2^2) + 1(2^1) + 1(2^0) = 111$ (in decimal form). Since each binary address identifies an address in FIG. 4 having a value greater by unity (since addresses in FIG. 4 start with 1 while binary addresses start with a value of 0), it is apparent that orthogonal word 112 is represented by the binary address.

The seven-bit orthogonal address identifies one column in a selected segment on FIG. 4. There are 512 bits in the column and only 64 orthogonal data conductors. Bits Y1, Y2, Y3 are cycled from 000 to 111 (see FIG. 10) while the seven-bit orthogonal address supplied by the processor remains represented on address conductors X1–X3, W1–W3, Y4. Since address conductors Y1, Y2, Y3 are extended to all chips, referring to the selected example of orthogonal word 112, it is apparent that when bits Y1, Y2, Y3 represent 000, the upper leftmost bit in each selected quarter-module is identified. At this time, if a read operation is being performed, bits 1, 9 . . . 505 are read out of the selected chips and appear on the 64 orthogonal data conductors OD1–OD64. On the other hand, in the case of a write operation, the 64 bits supplied by the processor on the 64 orthogonal data conductors are stored in bit locations 1, 9 . . . 505 of orthogonal word 112 in the memory. As soon as bits Y1, Y2, Y3 cycle to represent the address 001, (identifying the second row in every quarter-module), operations are performed on bits 2, 10 . . . 506 of the selected orthogonal word. This process continues until in the eighth step bits 8, 16 . . . 512 are operated upon.

Figure 1:
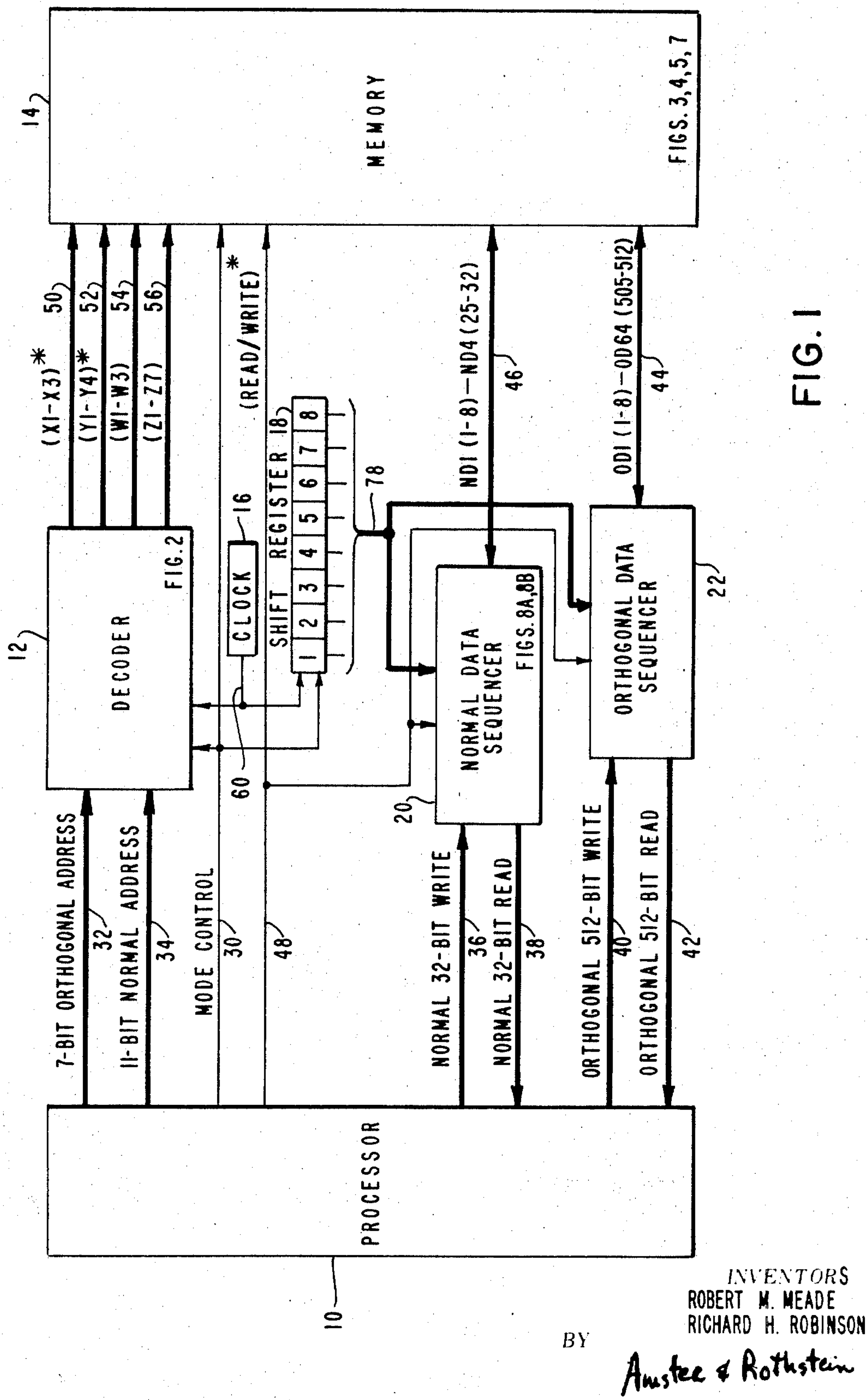
FIG. 1 depicts an illustrative embodiment of our invention, including a processor 10, a semiconductor orthogonal memory 14, and those units which provide the necessary interface between them.

FIG. 1 shows how the memory system of FIGS. 3, 4, 5 and 7 can be used in conjunction with a processor whose overall arithmetic performance requires operands only at the rate of one per eight orthogonal memory cycles. The processor 10 is provided with several input and output conductors and cables as follows:

a. The processor applies a signal to mode control conductor 30 which simply identifies whether an operation is to be performed on a normal word or an orthogonal word.

b. If an operation is to be performed on a normal word, an 11-bit normal address is applied by the processor to cable 34 (which carries 11 address conductors). The address identifies that one of the 2,048 normal words in memory 14 which is to be operated upon.

c. If the signal on mode control conductor 30 indicates that an operation is to be performed on an orthogonal word, a seven-bit orthogonal address is applied by the processor on cable 32 to identify a particular one of the 128 orthogonal words in memory 14.

d. The processor applies a signal on conductor 48 which indicates whether a word is to be written into the memory, or a word is to be read out of the memory. Conductor 48 is the (READ/WRITE)* conductor and, as described with reference to the memory system, is extended to every chip in the system.

e. In the event a normal word is to be written into memory 14, the 32-bit normal data word is applied by processor 10 to cable 36.

f. Similarly, if a normal word is to be read from the memory, after the four eight-bit sequences read out of the memory are combined, the full 32-bit normal word is delivered over cable 38 to the processor.

g. In the event an orthogonal word is to be written in the memory, the processor supplies a 512-bit orthogonal word on cable 40.

h. In the event an orthogonal word is to be read from the memory, after the 64 eight-bit sequences read out on the 64 orthogonal data conductors are combined, a 512-bit data word is delivered over cable 42 to the processor.

Decoder 12 serves to translate a seven-bit orthogonal address or an 11-bit normal address so as to appropriately energize address conductors X1–X3 (cable 50), Y1–Y4 (cable 52), W1–W3 (cable 54), Z1–Z7 (cable 56). As mentioned above, bits X1–X3 and Y1–Y4, which appear on respective cables 50 and 52, are identified with an asterisk in FIG. 1 since these bits are extended to every chip in the memory. With reference to FIGS. 9 and 10, it will be recalled that when an operation is to be performed on a normal word, address conductors W1, W2, W3 serve no purpose. It is for this reason that mode control conductor 30 is extended to the memory 14 to energize only decoder 64 when an operation is to be performed on a normal word (see FIG. 3). The mode control conductor 30 is also extended to decoder 12 to control the decoder to translate the 11-bit normal address such that the conductors depicted in FIG. 9.

On the other hand, when an operation is to be performed on an orthogonal word, mode control conductor 30 enables only decoder 62 in FiG. 3 to operate; address bits on conductors Z1–Z7 have no effect on the memory system. At the same time, the mode control signal transmitted to decoder 12 causes the decoder to energize the conductors in cables 50, 52, 54 (to the exclusion of cable 56) in accordance with the seven-bit orthogonal address on cable 32.

A clock 16 provides clock pulses to both decoder 12 and shift register 18. The clock generates eight pulses during each processor read or write cycle. As will be described with respect to the first-level decoder 12, the clock pulses are used to cycle address bits X1–X3 when an operation is to be performed on a normal word (see FIG. 9) and to cycle address bits Y1–Y3 when an operation is to be performed on an orthogonal word (see FIG. 10). Although not shown, clock 16 can be operated in synchronism with processor 10, as will be apparent to those skilled in the art.

Decoder 12, external to the modules in the memory, decodes a normal or orthogonal address to appropriately energize 14 address conductors for a normal operation (see FIG. 9) and 10 address conductors for an orthogonal operation (see FIG. 10). Subsequent decoding (in the memory system itself) takes place in two levels — bits W1–W3 or bits Z1–Z7 are decoded external of the modules (see FIG. 3), and bits Xi–X3, Y1–Y4 are decoded inside the modules (see FIGS. 3 and 7).

The four normal data conductors ND1–ND4 on cable 46 (FIG. 1) are extended between memory 14 and normal data sequencer 20. The sequencer functions, when the system operates in the write mode, to convert a 32-bit normal data word on the 32 conductors of cable 36 to four eight-bit sequences on the four conductors ND1–ND4 in cable 46. When the system operates in the read mode, normal data sequencer 20 serves to convert four eight-bit sequences appearing on conductors ND1–ND4 to a 32-bit word on the 32 conductors in cable 38. The READ/WRITE conductor 48 is extended to sequencer 20 in order to control one of the two conversion processes.

Sequencer 20 also requires 8 inputs which are energized in succession to control either conversion process. Eight input conductors are extended from shift register 18 over cable 78 to the sequencer. Mode control conductor 30 is extended to the set input of the shift register. As soon as a signal appears on the conductor to indicate that an operation is to be performed in either mode, the first stage of the shift register is energized. The clock pulses on conductor 60 are applied to the shift input of the register and the single 1 bit in the register is shifted down the register with each pulse. The eight output conductors are energized in succession to control the operation of sequencer 20.

Similarly, orthogonal data sequencer 22 serves to convert a 512-bit data word on cable 40 to 64 eight-bit sequences on conductors OD1–OD64 in the case of a write operation, and to convert the 64 eight-bit sequences on conductors OD1–OD64 to a 512-bit word on cable 42 in the case of a read operation. Sequencer 22 is also provided with eight inputs from shift register 18 and an input from READ/WRITE conductor 48 to inform it of which conversion process is to be performed.

Figure 2:
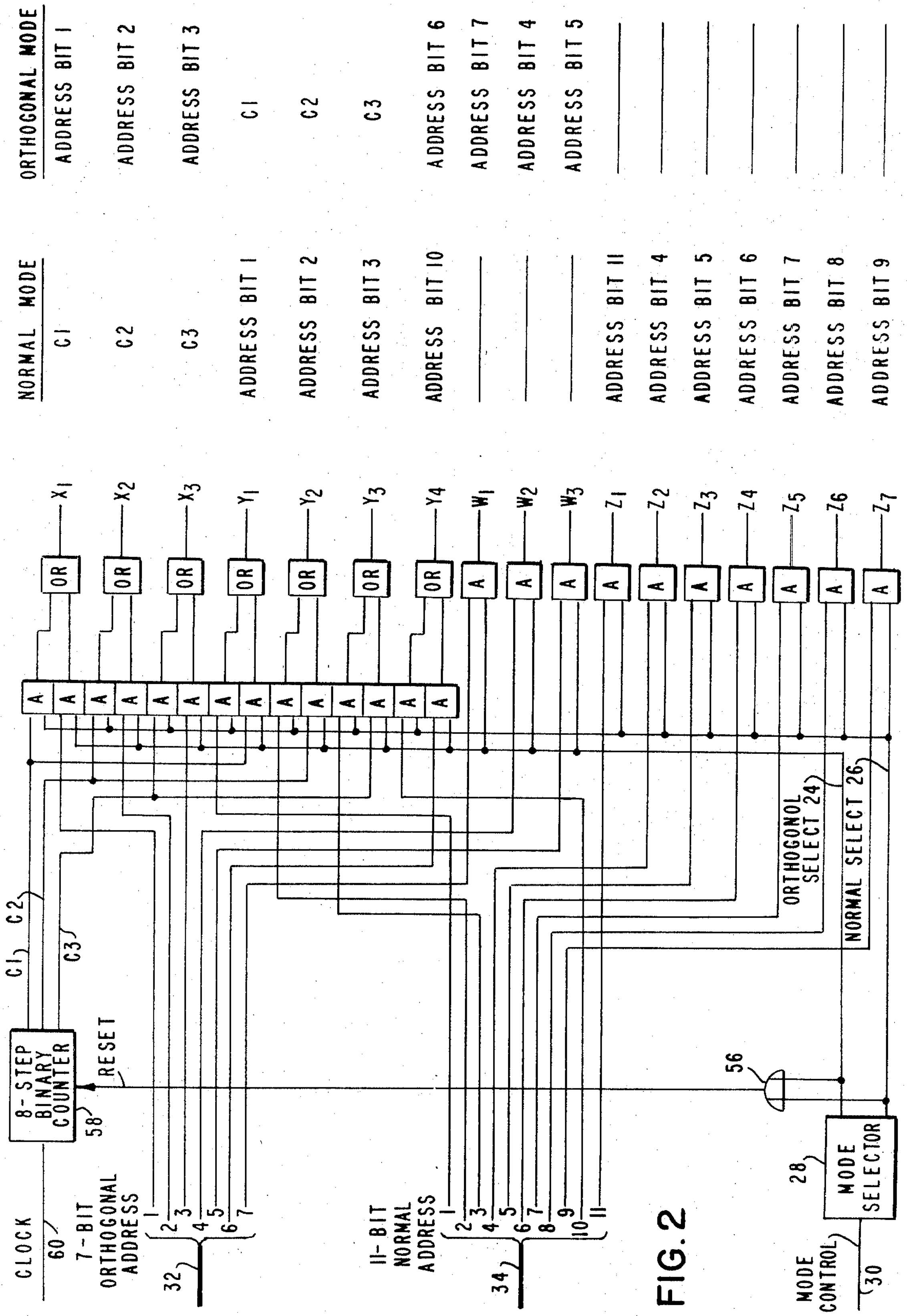
FIG. 2 illustrates the circuitry included in decoder 12 of FIG. 1.

The first-level decoder 12 is shown in detail in FIG. 2. Normal data sequencer 20 is shown in detail in FIGS. 8A, 8B. Orthogonal data sequencer 22 is not shown since, except for the number of conductors and gates, the sequencer is basically the same as sequencer 20, and its design will be apparent to those skilled in the art after a consideration of sequencer 20.

The mode control signal on conductor 30 is extended to mode selector 28 in decoder 12 as shown in FIG. 2. (Although shown as a single conductor throughout the drawing, it is to be understood that the mode control "-conductor" more conveniently comprises two conductors. For example, each can be associated with a particular mode, the energization of either being an indication of a new operation to be performed. Alternatively, one of the two conductors can be a "start" signal conductor and the state of the other can actually represent the mode of operation.) Mode selector 28 energizes either orthogonal select conductor 24 or normal select conductor 26. Both conductors are extended to respective inputs of OR gate 56, whose output is connected to the reset input of 8-step binary counter 58. The binary counter includes three output conductors C1, C2, C3. The states of these conductors represent the state of the counter, with conductor C1 being the least significant and conductor C3 being the most significant. The states of the three conductors cycle from 000 to 111, the state of the counter advancing with each clock pulse on input conductor 60.

The seven conductors in seven-bit orthogonal address cable 32 are extended to various AND (A) gates in the first-level decoder circuit, and the eleven conductors in 11-bit normal address cable 34 are extended to other AND gates in the decoder. The other inputs to the AND gates are conductors 24, 26 and conductors C1, C2, C3. Some of the AND gates have their outputs extended directly to address conductors W1–W3 and Z1–Z7, while other outputs of the AND gates are extended through various OR gates to address conductors X1–X3 and Y1–Y4.

When the system operates in the normal mode, normal select conductor 26 energizes one input of each of the AND gates associated with the address conductors Z1–Z7, and the upper one of each of the two AND gates whose outputs are extended to the OR gates associated with address conductors X1–X3 and Y1'Y4. Thus address conductors W1–W3 are not coded at all, and each of address conductors X1–X3 and Y1–Y4 is coded in accordance with the other input extended to the upper one of the two AND gates associated with the respective OR gate.

Conductors C1, C2, C3 are extended to three AND gates associated with respective address conductors X1–X3. Consequently, as indicated on the right side of FIG. 2, address conductors X1–X3 are coded in accordance with the state of the binary counter. It will be recalled that when reading or writing in the normal mode, address conductors X1–X3 are cycled from 000 to 111 while the 11-bit normal address maintains the other address conductors in fixed states of energization.

Referring to FIG. 9, it will be recalled that address bits 1, 2, 3, 10 respectively determine the states of address conductors Y1–Y4. Each of address bits 1, 2, 3, 10 in the 11-bit normal address is extended to the second input of the upper AND gate of the two AND gates associated with the respective one of conductors Y1–Y4. Each of these gates is energized and transmits a signal through the respective OR gate to appropriately energize one of address conductors Y1–Y4.

Also referring to FIG. 9, it will be recalled that address conductors Z1–Z7 are respectively energized in accordance with the values of address bits 11, 4, 5, 6, 7, 8, 9. The seven address conductors in the eleven-bit normal address cable 34 are extended to the respective AND gates whose outputs are coupled directly to address conductors Z1–Z7. Consequently, the appropriate address bits appear on address conductors Z1–Z7.

When the system operates in the orthogonal mode, conductor 24 is energized rather than conductor 26. In such a case, the AND gates whose outputs are coupled to address conductors Z1–Z7 are not energized. Instead, the three AND gates whose outputs are coupled to address conductors W1–W3, and the lower AND gate in each of the pairs associated with address conductors X1–X3 and Y1–Y4 have one of their inputs enabled. When operating in the orthogonal mode, the states of address conductors Y1–Y3 are cycled in accordance with the state of the counter. Consequently, each of conductors C1, C2, C3 is extended to one of the inputs of the lower AND gate in each pair associated with the respective one of address conductors Y1–Y3. As for address conductor Y4, it will be recalled with reference to FIG. 10 that the state of this conductor corresponds to address bit 6 in the seven-bit orthogonal address. Consequently, bit 6 is extended directly to an input of the lower AND gate of the two associated with address conductor Y4.

Address bits 1, 2, 3, as shown in FIG. 10, must appear on address conductors X1–X3. This is accomplished by extending each of the three input address bits to an input of the lower AND gate in each pair of AND gates associated with address conductors X1–X3.

Finally, address conductors W1–W3 must assume the states of respective address bits 7, 4, 5. The three respective address conductors in cable 32 are each extended to an input of one of the three AND gates associated with address conductors W1–W3 as shown in the drawing.

FIG. 2 depicts a typical decoder which can be used to energize the orthogonal memory address conductors in accordance with the seven-bit or 11-bit addresses on cables 32, 34. Obviously, decoders of other designs can be utilized as will be apparent to those skilled in the art.

Figure 8A:
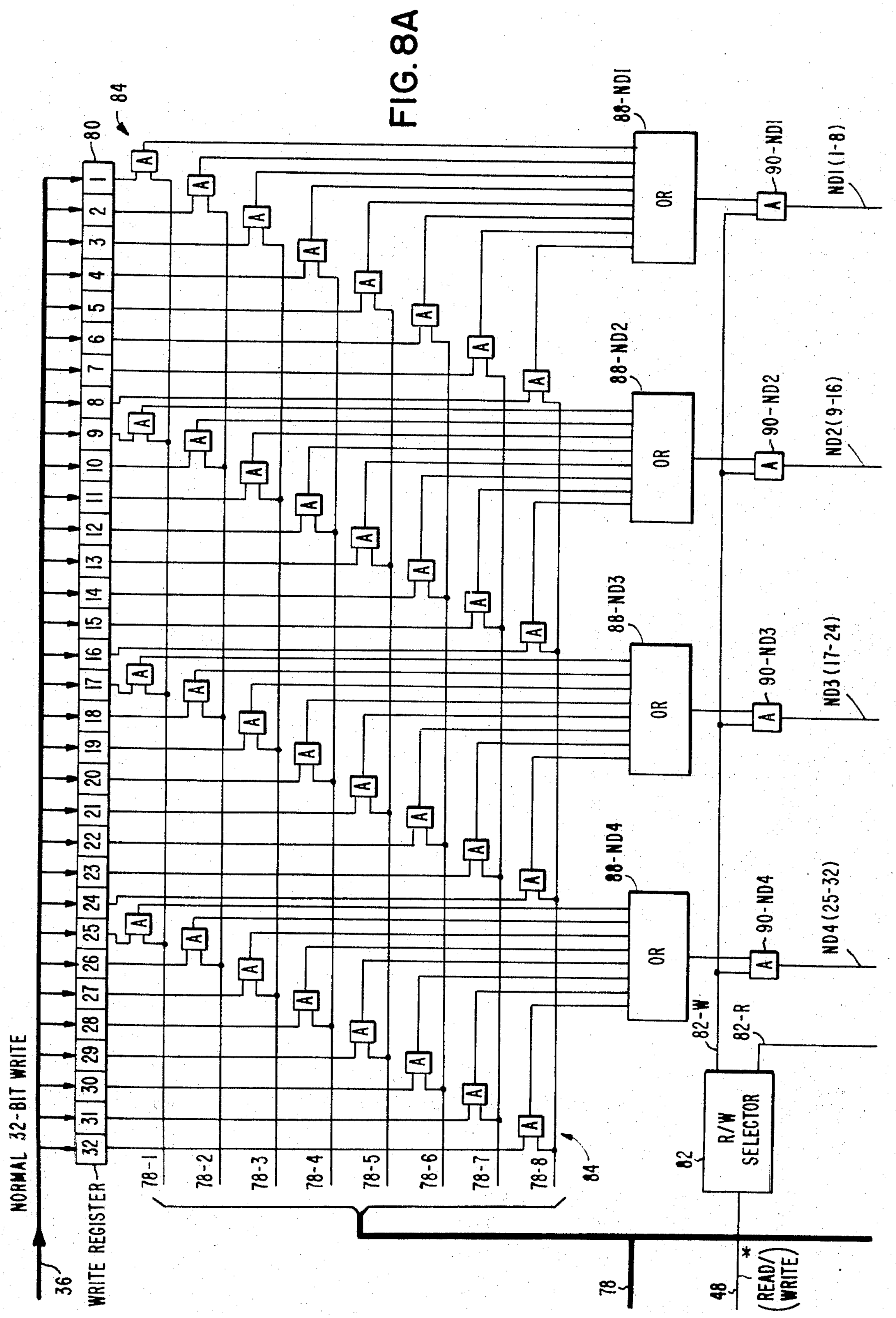
FIGS. 8A, 8B depict the circuitry included in normal data sequencer 20 of FIG. 1.
Figure 8B:
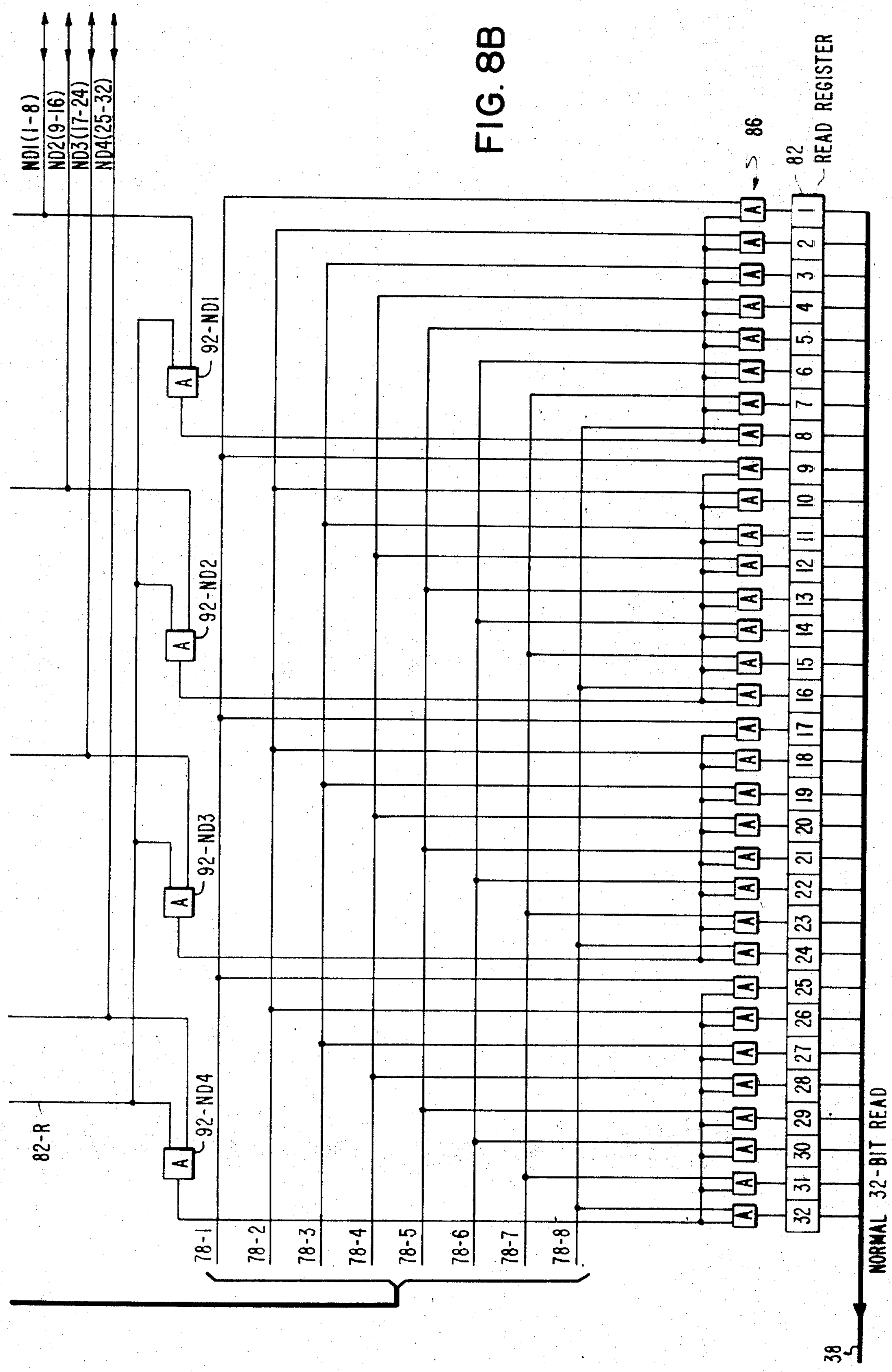

Sequencer 20 is shown in FIGS. 8A, 8B, with FIG. 8B being placed below FIG. 8A. While conductors ND1–ND4 are used for both read and write operations, for the most part the circuitry on FIG. 8A comes into play when a word is to be written into the memory system, and the circuitry on FIG. 8B comes into play when a word is to be read from the memory.

Referring to FIG. 8A, the processor delivers a 32-bit normal data word over cable 36 when a word is to be written into the orthogonal memory. The individual bits are stored in respective stages of register 80. There are four groups of AND gates 84, each group containing eight gates associated with a respective eight stages of the register. For example, the outputs of stages 1–8 of the register are extended to respective inputs of the right-most group of AND gates 84 on FIG. 8A. Each of the eight conductors 78-1 through 78-8 contained in cable 78 (extended from shift register 18 on FIG. 1 to sequencer 20) is connected to the second input of four of the AND gates — all included in the same row on FIG. 8A. The outputs of the rightmost group of AND gates are all coupled to inputs of OR gate 88-ND1. Each of the other OR gates 88-ND2, 88-ND3, 88-ND4 have as their eight inputs the outputs of a respective group of AND gates.

The (READ/WRITE)* signal on conductor 48 is extended to R/W selector 82. Depending on whether a read or write operation is to be performed, one of conductors 82-W or 82-R is energized. In the case of a write operation, conductor 82-W is energized so that one input of each of the four AND gates 90-ND1 through 90-ND4 is energized. The second input of each of these four AND gates is connected to the output of a respective one of OR gates 88-ND1 through 88-ND4. The outputs of the four AND gates are connected directly to respective conductors ND1 through ND4.

When a signal first appears on mode control conductor 30, it will be recalled that the first stage of shift register 18 on FIG. 1 is energized. Consequently, of conductors 78-1 through 78-8 on FIG. 8A, only conductor 78-1 is energized. This enables one input of each of the four AND gates associated with stages 1, 9, 17 and 25 of register 80. These gates operate (depending on whether the respective bits contained in register 80 are 0's or 1's) and cause the four data bits to be transmitted through OR gates 88-ND1 through 88-ND4 to respective conductors ND1 through ND4. As soon as conductor 78-1 is de-energized and conductor 78-2 is energized, the four gates associated with stages 2, 10, 18, and 26 of the register are enabled. Consequently, bits 2, 10, 18 and 26 of the 32-bit normal data word are transmitted over conductors ND1–ND4 to the orthogonal memory. It is apparent that as conductors 78-1 through 78-8 are successively energized, eight bits in succession appear on each of conductors ND1–ND4 as described above. The eight bits on each conductor are stored at different bit locations in the memory since at the same time that a different one of conductors 78-1 through 78-8 is energized, the states of address conductors Y1–Y3 cycle under the control of clock 16, the same clock controlling the cycling of both first-level decoder 12 and shift register 18 (see FIG. 1).

It should be noted that during a write operation, all data bits appearing on conductors ND1–ND4 are not extended to the circuitry shown on FIG. 8B. Although the four conductors ND1-ND4 are connected to respective inputs of AND gates 92-ND1 through 92-ND4, the other input of each of these gates is connected to conductor 82-R which is de-energized during a write operation.

However, each of these gates is energized during a read operation when selector 82 energizes conductor 82-R rather than conductor 82-W. During a read operation, eight bits in sequence appear on each of conductors ND1–ND4. Consequently, eight bits in sequence appear at the output of each of AND gates 92-ND1 through 92-ND4.

Thirty-two AND gates 86 are associated with respective stages of register 82. One input of each of eight of these gates is connected to the output of a respective one of gates 92-ND1 through 92-ND4. Conductors 78-1 through 78-8 are each coupled to the second input of one gate in each group of eight.

When bits 1, 9, 17, 25 appear on conductors ND1–ND4, conductor 78-1 is energized. Consequently, at this time the right-most AND gate in each group of eight AND gates associated with register 82 is enabled. Bit 1 is thus stored in stage 1 of register 82, bit 9 is stored in stage 9, bit 17 is stored in stage 17, and bit 25 is stored in stage 25. Immediately thereafter, conductor 78-1 is de-energized and conductor 78-2 is energized. At this time, the second gate in each group of eight is enabled. Since bits 2, 10, 18, 26 now appear on respective conductors ND1–ND4, it is apparent that the four bits are stored in the respective stages of register 82.

This process continues until after conductor 78-8 has been energized and bits 8, 16, 24, 32 have been stored in respective stages of the register. At this time, the register contains a full 32-bit normal word. Toward the end of the read cycle of the processor, the 32 conductors in cable 38 are examined by the processor for the word read from the orthogonal memory. Although the work is actually retrieved from the memory along four parallel lines (ND1–ND4) in eight steps, the word supplied to the processor consists of a full word appearing on 32 parallel conductors in cable 38.

Although the invention has been described with reference to a particular embodiment, it is to be understood that this embodiment is merely illustrative of the application of the principles of the invention. For example, if each module includes only a single chip, only half as many normal chip select conductors and only half as many column chip select conductors are necessary. Similarly, if each module contains only a 64-bit chip array, the Y4 address bit is not required to identify one of two selected segments (since the six bits X1–X3, Y1–Y3 are sufficient to identify a single one of 64 bits). Furthermore, the principles of our invention are applicable to other types of memories, such as magnetic core arrays, although the advantages of the invention are more fully realized in the case of semiconductor memories. If the semiconductor chips used do not have internal decoding capabilities, the horizontal set of conductors in all chips would be connected in parallel as would the vertical conductors in all chips. Thus by energizing an appropriate horizontal conductor and an appropriate vertical conductor, the same bit storage location in each chip would be identified. The second level of decoding would thus take place external to the chips, but the system would still exhibit the two levels of decoding, one of which controls the selection of a module (or chip) and the other of which controls the identification of the same bit storage location in each module (or chip). Unlike prior art orthogonal memory systems, in accordance with the principles of our invention it is possible to construct an orthogonal memory in which the length of an orthogonal word can be varied at will relative to the length of a normal word, without there being any need to dimension the memory array itself to match the entire orthogonal memory. Thus it is to be understood that numerous modifications may be in the illustrative embodiment of the invention and other arrangements may be devised without departing from the spirit and scope of the invention.

What we claim is:

1. A semiconductor orthogonal memory system comprising a plurality of column chip select conductors, a plurality of row chip select conductors, a plurality of semiconductor chip memory modules each having a plurality of bistable devices, said modules being arranged in rows and columns, a plurality of row orthogonal data conductors and a plurality of column normal data conductors coupled to said memory modules, means coupling rows and columns of said chip select conductors and said data conductors to respective rows and columns of said modules, each module in every row of modules containing at least one bit in a normal word and each module in every column of modules containing at least one bit in an orthogonal word, and a plurality of selectively energizable conductors extended to said modules in common to identify the same bit storage locations in all of said modules.

2. A semiconductor orthogonal memory system in accordance with claim 1 wherein said plurality of energizable conductors includes a plurality of address conductors extended in common to all of said modules, and all of said modules include means for decoding address bits on said address conductors for identifying respective bit storage locations in said modules.

3. A semiconductor orthogonal memory system in accordance with claim 2 further including means for cycling the address bits represented on at least one of said address conductors while a selected one of said column or row chip select conductors remains energized.

4. A semiconductor orthogonal memory system in accordance with claim 3 wherein the bit storage locations in each of said modules are divided into a plurality of numbered segments, and means for coupling said row and column chip select conductors to said modules such that the energization of one of said row or column chip select conductors identifies bit storage locations in the same number segments in all of the modules coupled thereto.

5. A semiconductor orthogonal memory system in accordance with claim 4 wherein at least one of said address conductors identifies the same number segments in all of said modules.

6. A semiconductor orthogonal memory system in accordance with claim 5 wherein said cycling means comprises means to cycle the bits on a first sub-group of said address conductors when an operation is to be performed upon a normal word contained in said modules and to cycle the bits on a second and different sub-group of said address conductors when an operation is to be performed upon an orthogonal word contained in said modules.

7. A semiconductor orthogonal memory system in accordance with claim 6 further including a common conductor extended to all of said modules, said conductor having a state which represents whether a read or a write operation is to be performed on a word contained in said modules.

8. A semiconductor orthogonal memory system in accordance with claim 7 further including means for controlling the writing of a word in said modules by applying a series of bits on either all of said normal data conductors or all of said orthogonal data conductors while the bits on one of said first or second sub-groups of address conductors are cycled.

9. A semiconductor orthogonal memory system in accordance with claim 7 further including means for controlling the formation of a complete normal or a complete orthogonal word read from said modules by combining the bit sequences appearing on said normal or said orthogonal data conductors while the bits on one of said first or second sub-groups of address conductors are cycled.

10. A semiconductor orthogonal memory system in accordance with claim 9 wherein means are provided for operating upon a single bit location in each of said modules at any time and each of said modules contains a number of bit storage locations equal to the number of segments in the module multiplied by $N^2$, where N is the number of times the bits on one of said first or second sub-groups of address conductors are changed during an operation on one of said normal or orthogonal words.

11. A semiconductor orthogonal memory system in accordance with claim 8 wherein means are provided for operating upon a single bit location in each of said modules at any time and each of said modules contains a number of bit storage locations equal to the number of segments in the module multiplied by $N^2$, where N is the number of times the bits on one of said first or second sub-groups of address conductors are changed during an operation on one of said normal or orthogonal words.

12. A semiconductor orthogonal memory system in accordance with claim 1 further including means for cycling the states of energization of at least one of said energizable conductors while a selected one of said column or row chip select conductors remains energized.

13. A semiconductor orthogonal memory system in accordance with claim 12 wherein the bit storage locations in each of said modules are divided into a plurality of numbered segments, and means for coupling said row and column chip select conductors to said modules such that the energization of one of said row or column chip select conductors identifies bit storage locations in the same number segments in all of the modules coupled thereto.

14. A semiconductor orthogonal memory system in accordance with claim 13 wherein at least one of said energizable conductors identifies the same number segments in all of said modules.

15. A semiconductor orthogonal memory system in accordance with claim 13 wherein said cycling means comprises means to cycle the states of energization of a first sub-group of said energizable conductors when an operation is to be performed upon a normal word contained in said modules and to cycle the states of energization of a second and different sub-group of said energizable conductors when an operation is to be performed upon an orthogonal word contained in said modules.

16. A semiconductor orthogonal memory system in accordance with claim 15 further including a common conductor extended to all of said modules, said conductor having a state which represents whether a read or a write operation is to be performed on a word contained in said modules.

17. A semiconductor orthogonal memory system in accordance with claim 15 further including means for controlling the writing of a word in said modules by applying a series of bits on either all of said normal data conductors or all of said orthogonal data conductors while the states of energization of one of said first or second sub-groups of energizable conductors are cycled.

18. A semiconductor orthogonal memory system in accordance with claim 15 further including means for controlling the formation of a complete normal or a complete orthogonal word read from said modules by combining the bit sequences appearing on said normal or said orthogonal data conductors while the states of energization of one of said first or second sub-groups of energizable conductors are cycled.

19. A semiconductor orthogonal memory system in accordance with claim 18 wherein means are provided for operating upon a single bit location in each of said modules at any time and each of said modules contains a number of bit storage locations equal to the number of segments in the module multiplied by $N^2$, where N is the number of times the states of energization of one of said first or second sub-groups of energizable conductors are changed during an operation on one of said normal or orthogonal words.

20. A semiconductor orthogonal memory system in accordance with claim 17 wherein means are provided for operating upon a single bit location in each of said modules at any time and each of said modules contains a number of bit storage locations equal to the number of segments in the module multiplied by $N^2$, where N is the number of times the states of energization of one of said first or second sub-groups of energizable conductors are changed during an operation on one of said normal or orthogonal words.

21. A semiconductor orthogonal memory system in accordance with claim 12 wherein said cycling means comprises means to cycle the states of energization of a first sub-group of said energizable conductors when an operation is to be performed upon a normal word contained in said modules and to cycle the states of energization of a second and different sub-group of said energizable conductors when an operation is to be performed upon an orthogonal word contained in said modules.

22. A semiconductor orthogonal memory system in accordance with claim 21 further including means for controlling the writing of a word in said modules by applying a series of bits on either all of said normal data conductors or all of said orthogonal data conductors while the states of energization of one of said first or second sub-groups of energizable conductors are cycled.

23. A semiconductor orthogonal memory system in accordance with claim 21 further including means for controlling the formation of a complete normal or a complete orthogonal word read from said modules by combining the bit sequences appearing on said normal or said orthogonal data conductors while the states of energization of one of said first or second sub-groups of energizable conductors are cycled.

24. A semiconductor orthogonal memory system in accordance with claim 23 wherein means are provided for operating upon a single bit location in each of said modules at any time and each of said modules contains a number of bit storage locations equal to at least $N^2$, where N is the number of times the states of energization of one of said first or second sub-groups of energizable conductors are changed during an operation on one of said normal or orthogonal words.

25. A semiconductor orthogonal memory system in accordance with claim 22 wherein means are provided for operating upon a single bit location in each of said modules at any time and each of said modules contains a number of bit storage locations equal to at least $N^2$, where N is the number of times the states of energization of one of said first or second sub-groups of energizable conductors are changed during an operation on one of said normal or orthogonal words.

26. A semiconductor orthogonal memory system in accordance with claim 1 wherein the bit storage locations in each of said modules are divided into a plurality of numbered segments, and said row and means are provided for coupling column chip select conductors to said modules such that the energization of one of said row or column chip select conductors identifies bit storage locations in the same number segments in all of the modules coupled thereto.

27. A semiconductor orthogonal memory system in accordance with claim 26 wherein at least one of said energizable conductors identifies the same number segments in all of said modules.

28. A semiconductor orthogonal memory system in accordance with claim 1 further including means for controlling the writing of a word in said modules by applying bit signals simultaneously on either all of said normal data conductors or all of said orthogonal data conductors.

29. A semiconductor orthogonal memory system in accordance with claim 1 further including means for controlling the formation of a complete normal or a complete orthogonal word read from said modules by combining the bit signals appearing on said normal or said orthogonal data conductors.

30. A semiconductor orthogonal memory system in accordance with claim 1 wherein each of said modules includes a pair of chips, a pair of row chip select conductors is associated with each row of modules with one of the pair of row chip select conductors being coupled to a respective one of the two chips in each module in the associated row, a pair of column chip select conductors is associated with each column of modules with one of the pair of column chip select conductors being coupled to a respective one of the two chips in each module in the associated column, and the two chips in each of said modules are coupled in common to a respective pair of row orthogonal and column normal data conductors.

31. A semiconductor orthogonal memory system in accordance with claim 30 further including means for cycling the states of energization of at least one of said energizable conductors while a selected one of said column or row chip select conductors remains energized.

32. A semiconductor orthogonal memory system in accordance with claim 31 wherein the bit storage locations in each of said chips are divided into two numbered segments, there being four numbered segments in each module, and means are provided for coupling each pair of said row and each pair of said column chip select conductors to said modules such that the energization of one of said row or column chip select conductors identifies the chip containing the two same numbered segments in all of the modules coupled thereto.

33. A semiconductor orthogonal memory system in accordance with claim 32 wherein at least one of said energizable conductors identifies the same number segments in all of said modules.

34. A semiconductor orthogonal memory system in accordance with claim 33 wherein said cycling means comprises means to cycle the states of energization of a first sub-group of said energizable conductors when an operation is to be performed upon a normal word contained in said modules and to cycle the states of energization of a second and different sub-group of said energizable conductors when an operation is to be performed upon an orthogonal word contained in said modules.

35. A semiconductor orthogonal memory system in accordance with claim 34 further including a common conductor extended to all of said modules, said conductor having a state which represents whether a read or a write operation is to be performed on a word contained in said modules.

36. A semiconductor orthogonal memory system in accordance with claim 35 further including means for controlling the writing of a word in said modules by applying a series of bits on either all of said normal data conductors or all of said orthogonal data conductors while the states of energization of one of said first or second sub-groups of energizable conductors are cycled.

37. A semiconductor orthogonal memory system in accordance with claim 34 further including means for controlling the formation of a complete normal or a complete orthogonal word read from said modules by combining the bit sequences appearing on said normal or said orthogonal data conductors while the states of energization of one of said first or second sub-groups of energizable conductors are cycled.

38. A semiconductor orthogonal memory system in accordance with claim 37 wherein means are provided for operating upon a single bit location in each of said modules at any time and each of said modules contains a number of bit storage locations equal to four times $N^2$, where N is the number of times the states of energization of one of said first or second sub-groups of energizable conductors are changed during an operation on one of said normal or orthogonal words.

39. A semiconductor orthogonal memory system in accordance with claim 36 wherein means are provided for operating upon a single bit location in each of said modules at any time and each of said modules contains a number of bit storage locations equal to four times $N^2$, where N is the number of times the states of energization of one of said first or second sub-groups of energizable conductors are changed during an operation on one of said normal or orthogonal words.

40. A semiconductor orthogonal memory system in accordance with claim 1 wherein each of said modules includes at least two chips, a group of at least two row chip select conductors are associated with each row of modules with one of the group of row chip select conductors being coupled to a respective one of the at least two chips in each module in the associated row, a group of at least two column chip select conductors are associated with each column of modules with one of the group of column chip select conductors being coupled to a respective one of the at least two chips in each module in the associated column, and the at least two chips in each of said modules are coupled in common to a respective pair of row orthogonal and column normal data conductors.

41. A semiconductor orthogonal memory system in accordance with claim 40 wherein the bit storage locations in each of said chips are divided into at least two numbered segments, there being at least four numbered segments in each module, and means for coupling each group of said row and each group of said column chip select conductors to said modules such that the energization of one of said row or column chip select conductors identifies the chip containing the same numbered segments in all of the modules coupled thereto.

42. A semiconductor orthogonal memory system in accordance with claim 41 wherein at least one of said energizable conductors identifies the same number segments in all of said modules.

43. A semiconductor orthogonal memory system in accordance with claim 42 further including means or cycling the states of energization of at least one of said energizable conductors while a selected one of said column or row chip select conductors remains energized.

44. A semiconductor orthogonal memory system in accordance with claim 43 wherein said cycling means comprises means to cycle the states of energization of a first sub-group of said energizable conductors when an operation is to be performed upon a normal word contained in said modules and to cycle the states of energization of a second and different sub-group of said energizable conductors when an operation is to be performed upon an orthogonal word contained in said modules.

45. A semiconductor orthogonal memory system in accordance with claim 44 further including a common conductor extended to all of said modules, said conductor having a state which represents whether a read or a write operation is to be performed on a word contained in said modules.

46. A semiconductor orthogonal memory system in accordance with claim 45 further including means for controlling the writing of a word in modules by applying a series of bits on either all of said normal data conductors or all of said orthogonal data conductors while the states of energization of one of said first or second sub-groups of energizable conductors are cycled.

47. A semiconductor orthogonal memory system in accordance with claim 44 further including means for controlling the formation of a complete normal or a complete orthogonal word read from said modules by combining the bit sequences appearing on said normal or said orthogonal data conductors while the states of energization of one of said first or second sub-groups of energizable conductors are cycled.

48. A semiconductor orthogonal memory system in accordance with claim 47 wherein means are provided for operating upon a single bit location in each of said modules at any time and each of said modules contains a number of bit storage locations equal to the number of segments in the module multiplied by $N^2$, where N is the number of times the states of energization of one of said first or second sub-groups of energizable conductors are changed during an operation on one of said normal or orthogonal word.

49. A semiconductor orthogonal memory system in accordance with claim 46 wherein means are provided for operating upon a single bit location in each of said modules at any time and each of said modules contains a number of bit storage locations equal to the number of segments in the module multiplied by $N^2$, where N is the number of times the states of energization of one of said first or second sub-groups of energizable conductors are changed during an operation on one of said normal or orthogonal words.

50. A semiconductor orthogonal memory system in accordance with claim 40 further including means for cycling the states of energization of at least one of said energizable conductors while a selected one of said column or row chip select conductors remains energized.

51. A semiconductor orthogonal memory system in accordance with claim 50 wherein said cycling means comprises means to cycle the states of energization of a first sub-group of said energizable conductors when an operation is to be performed upon a normal word contained in said modules and to cycle the states of energization of a second and different sub-groups of said energizable conductors when an operation is to be performed upon an orthogonal word contained in said modules.

52. A semiconductor orthogonal memory system in accordance with claim 51 further including a common conductor extended to all of said modules, said conductor having a state which represents whether a read or a write operation is to be performed on a word contained in said modules.

53. A semiconductor orthogonal memory system in accordance with claim 52 further including means for controlling the writing of a word in said modules by applying a series of bits on either all of said normal data conductors or all of said orthogonal data conductors while the states of energization of one of said first or second sub-groups of energizable conductors are cycled.

54. A semiconductor orthogonal memory system in accordance with claim 51 further including means for controlling the formation of a complete normal or a complete orthogonal word read from said modules by combining the bit sequences appearing on said normal or said orthogonal data conductors while the states of energization of one of said first or second sub-groups of energizable conductors are cycled.

55. A semiconductor orthogonal memory system in accordance with claim 54 wherein means are provided for operating upon a single bit location in each of said modules at any time and each of said chips contains a number of bit storage locations equal to $N^2$, where N is the number of times the states of energization of one of said first or second sub-groups of energizable conductors are changed during an operation on one of said normal or orthogonal words.

56. A semiconductor orthogonal memory system in accordance with claim 53 wherein means are provided for operating upon a single bit location in each of said modules at any time and each of said chips contains a number of bit storage locations equal to $N^2$, where N is the number of times the states of energization of one of said first or second sub-groups of energizable conductors are changed during an operation on one of said normal or orthogonal words.

57. A semiconductor orthogonal memory system in accordance with claim 40 wherein said plurality of energizable conductors includes a plurality of address conductors extended in common to all of said modules, and all of said modules include means for decoding address bits on said address conductors for identifying respective bit storage locations in said modules, and further including means for cycling the bits on a first sub-group of said address conductors when an operation is to be performed upon a normal word contained in said modules and for cycling the bits on a second and different sub-group of said address conductors when an operation is to be performed upon an orthogonal word contained in said modules, means for representing the word address of a normal or an orthogonal word to be operated upon, said word address including at least two groups of bits, and decoding means for energizing said second sub-group of address conductors in accordance with the least significant group of bits in said word address when an operation is to be performed upon a normal word and for energizing said first sub-group of address conductors in accordance with the least significant group of bits in said word address when an operation is to be performed upon an orthogonal word.

58. A semiconductor orthogonal memory system in accordance with claim 57 wherein said decoding means comprises means for selectively energizing one of said row or column chip select conductors in accordance with bit information contained in the most significant group of bits in said word address.

59. A semiconductor orthogonal memory system in accordance with claim 57 wherein said decoding means comprises means for energizing at least one of said address conductors not included in either of said first or second sub-groups in accordance with bit information contained in the most significant group of bits in said word address.

60. A semiconductor orthogonal memory system in accordance with claim 59 wherein the bit storage locations in each of said modules are divided into a plurality of numbered segments, means are provided for coupling said row and column chip select conductors to said modules such that the energization of one of said row or column chip select conductors identifies bit storage locations in the same number segments in all of the modules coupled thereto, and means are provided for identifying the same number segments in all of said modules in accordance with the value of at least the most significant bit in said word address.

61. A semiconductor orthogonal memory system in accordance with claim 58 wherein the bit storage locations in each of said modules are divided into a plurality of numbered segments, means are provided for coupling said row and column chip select conductors to said modules such that the energization of one of said row or column chip select conductors identifies bit storage locations in the same number segments in all of the modules coupled thereto, and means are provided for identifying the same number segments in all of said modules in accordance with the value of at least the most significant bit in said word address.

62. A semiconductor orthogonal memory system in accordance with claim 1 further including means for cycling the states of energization of a first sub-group of said energizable conductors when an operation is to be performed upon a normal word contained in said modules and for cycling the states of energization of a second and different sub-group of said energizable conductors when an operation is to be performed upon an orthogonal word contained in said modules, means for representing the word address of a normal or an orthogonal word to be operated upon, said word address including at least two groups of bits, and decoding means for energizing said second sub-group of energizable conductors in accordance with the least significant group of bits in said word address when an operation is to be performed upon a normal word and for energizing said first sub-group of energizable conductors in accordance with the least significant group of bits in said word address when an operation is to be performed upon an orthogonal word.

63. A semiconductor orthogonal memory system in accordance with claim 62 wherein said decoding means comprises means for selectively energizing one of said row or column chip select conductors in accordance with bit information contained in the most significant group of bits in said word address.

64. A semiconductor orthogonal memory system in accordance with claim 62 wherein said decoding means comprises means for energizing at least one of said energizable conductors not included in either of said first or second sub-groups in accordance with bit information contained in the most significant group of bits in said word address.

65. A semiconductor orthogonal memory system in accordance with claim 64 wherein the bit storage locations in each of said modules are divided into a plurality of numbered segments, means are provided for coupling said row and column chip select conductors to said modules such that the energization of one of said row or column chip select conductors identifies bit storage locations in the same number segments in all of the modules coupled thereto, and means are provided for identifying the same number segments in all of said modules in accordance with the value of at least the most significant bit in said word address.

66. A semiconductor orthogonal memory system in accordance with claim 63 wherein the bit storage locations in each of said modules are divided into a plurality of numbered segments, means are provided for coupling said row and column chip select conductors are coupled to said modules such that the energization of one of said row or column chip select conductors identifies bit storage locations in the same number segments in all of the modules coupled thereto, and means are provided for coupling the same number segments in all of said modules are identified in accordance with the value of at least the most significant bit in said word address.

67. An orthogonal memory system comprising a first plurality of select conductors, a second orthogonal plurality of select conductors, a first plurality of normal data conductors, a second plurality of orthogonal data conductors, a plurality of multi-bit memory arrays, means coupling each of the conductors in said first and second pluralities of select and data conductors to respective groups of said arrays, each array containing at least one bit in a normal word and at least one bit in an orthogonal word, and a plurality of selectively energizable conductors extended to said arrays in common to energize the same selected bit storage locations in all of said arrays.

68. An orthogonal memory system in accordance with claim 67 further including means for cycling the states of energization of at least one of said energizable conductors while a selected conductor in one of said first or second pluralities of select conductors remains energized.

69. An orthogonal memory system in accordance with claim 68 wherein the bit storage locations in each of said arrays are divided into a plurality of numbered segments, and means are provided for coupling the conductors in said first and second pluralities of select conductors to said arrays such that the energization of one of said select conductors identifies bit storage locations in the same number segments in all of the arrays coupled thereto.

70. An orthogonal memory system in accordance with claim 69 wherein at least one of said energizable conductors identifies the same number segments in all of said arrays.

71. An orthogonal memory system in accordance with claim 69 wherein said cycling means comprises means to cycle the states of energization of a first sub-group of said energizable conductors when an operation is to be performed upon a normal word contained in said arrays and to cycle the states of energization of a second and different sub-group of said energizable conductors when an operation is to be performed upon an orthogonal word contained in said arrays.

72. An orthogonal memory system in accordance with claim 71 further including a common conductor extended to all of said arrays, said conductor having a state which represents whether a read or a write operation is to be performed on a word contained in said modules.

73. An orthogonal memory system in accordance with claim 71 further including means for controlling the writing of a word in said arrays by applying a series of bits on either all of said normal data conductors or all of said orthogonal data conductors while the states of energization of one of said first or second sub-groups of energizable conductors are cycled.

74. An orthogonal memory system in accordance with claim 71 further including means for controlling the formation of a complete normal or a complete orthogonal word read from said arrays by combining the bit sequences appearing on said normal or said orthogonal data conductors while the states of energization of one of said first or second sub-groups of energizable conductors are cycled.

75. An orthogonal memory system in accordance with claim 74 wherein means are provided for operating upon a single bit location in each of said arrays at any time and each of said arrays contains a number of bit storage locations equal to the number of segments in the array multiplied by $N^2$, where N is the number of times the states of energization of one of said first or second sub-groups of energizable conductors are changed during an operation on one of said normal or orthogonal words.

76. An orthogonal memory system in accordance with claim 73 wherein means are provided for operating upon a single bit location in each of said arrays at any time and each of said arrays contains a number of bit storage locations equal to the number of segments in the array multiplied by $N^2$, where N is the number of times the states of energization of one of said first or second sub-groups of energizable conductors are changed during an operation on one of said normal or orthogonal words.

77. An orthogonal memory system in accordance with claim 68 wherein said cycling means comprises means to cycle the states of energization of a first sub-group of said energizable conductors when an operation is to be performed upon a normal word contained in said arrays and to cycle the states of energization of a second and different sub-group of said energizable conductors when an operation is to be performed upon an orthogonal word contained in said arrays.

78. An orthogonal memory system in accordance with claim 77 further including means for controlling the writing of a word in said arrays by applying a series of bits on either all of said normal data conductors or all of said orthogonal data conductors while the states of energization of one of said first or second sub-groups of energizable conductors are cycled.

79. An orthogonal memory system in accordance with claim 77 further including means for controlling the formation of a complete normal or a complete orthogonal word read from said array by combining the bit sequences appearing on said normal or said orthogonal data conductors while the states of energization of one of said first or second sub-groups of energizable conductors are cycled.

80. An orthogonal memory system in accordance with claim 79 wherein means are provided for operating upon a single bit location in each of said arrays can be operated upon at any time and each of said arrays contains a number of bit storage locations equal to at least $N^2$, where N is the number of times the states of energization of one of said first or second sub-groups of energizable conductors are changed during an operation on one of said normal or orthogonal words.

81. An orthogonal memory system in accordance with claim 78 wherein means are provided for operating upon a single bit location in each of said arrays at any time and each of said arrays contains a number of bit storage locations equal to at least $N^2$, where N is the number of times the states of energization of one of said first or second sub-groups of energizable conductors are changed during an operation on one of said normal or orthogonal words.

82. An orthogonal memory system in accordance with claim 67 wherein the bit storage locations in each of said arrays are divided into a plurality of numbered segments, and means are provided for coupling said select conductors to said arrays such that the energization of one of the conductors in one of said first or second pluralities of select conductors identifies bit storage locations in the same number segments in all of the arrays coupled thereto.

83. An orthogonal memory system in accordance with claim 82 wherein at least one of said energizable conductors identifies the same number segments in all of said arrays.

84. An orthogonal memory system in accordance with claim 67 further including means for controlling the writing of a word in said arrays by applying bit signals simultaneously on either all of said normal data conductors or all of said orthogonal data conductors.

85. An orthogonal memory system in accordance with claim 67 further including means for controlling the formation of a complete normal or a complete orthogonal word read from said arrays by combining the bit signals appearing on said normal or said orthogonal data conductors.

86. An orthogonal memory system in accordance with claim 67 further including means for cycling the states of energization of a first sub-group of said energizable conductors when an operation is to be performed upon a normal word contained in said arrays and for cycling the states of energization of a second and different sub-group of said energizable conductors when an operation is to be performed upon an orthogonal word contained in said arrays, means for representing the word address of a normal or an orthogonal word to be operated upon, said word address including at least two groups of bits, and decoding means for energizing said second sub-group of energizable conductors in accordance with the least significant group of bits in said word address when an operation is to be performed upon a normal word and for energizing said first sub-group of energizable conductors in accordance with the least significant group of bits in said word address when an operation is to be performed upon an orthogonal word.

87. An orthogonal memory system in accordance with claim 86 wherein said decoding means comprises means for selectively energizing one of the conductors in said first or second pluralities of select conductors in accordance with bit information contained in the most significant group of bits in said word address.

88. An orthogonal memory system in accordance with claim 86 wherein said decoding means comprises means for energizing at least one of said energizable conductors not included in either of said first or second sub-groups in accordance with bit information contained in the most significant group of bits in said word address.

89. An orthogonal memory system in accordance with claim 88 wherein the bit storage locations in each of said arrays are divided into a plurality of numbered segments, means are provided for coupling said select conductors to said arrays such that the energization of one of the conductors in one of said first or second pluralities of select conductors identifies bit storage locations in the same number segments in all of the arrays coupled thereto, and means are provided for identifying the same number segments in all of said arrays in accordance with the value of at least the most significant bit in said word address.

90. An orthogonal memory system in accordance with claim 87 wherein the bit storage locations in each of said modules are divided into a plurality of numbered segments, said select conductors are coupled to said modules such that the energization of one of the conductors in one of said first or second pluralities of select conductors identifies bit storage locations in the same number segments in all of the modules coupled thereto, and the same number segments in all of said modules are identified in accordance with the value of at least the most significant bit in said word address.

91. An orthogonal memory system in accordance with claim 90 wherein the number of bit storage locations in each of said arrays is equal to the product of three factors, the first factor being equal to the number of bit storage locations in each of said arrays which can be operated upon simultaneously, the second factor being equal to the number of segments in each array, and the third factor being equal to $N^2$, where N is the number of times the states of energization of one of said first or second sub-groups of energizable conductors are changed during an operation on one of said normal or orthogonal words.

92. An orthogonal memory system in accordance with claim 86 wherein each of said arrays includes a number of bit storage locations equal to at least the product of two factors, the first factor being equal to the number of bit storage locations in each of said arrays which can be operated upon simultaneously, and the second of said factors being equal to $N^2$, where N is the number of times the states of energization of one of said first or second sub-groups of energizable conductors are changed during an operation on one of said normal or orthogonal words.

93. An orthogonal memory comprising, in combination, a plurality of bistable devices; said devices providing a set of arrays; each one of said arrays having word and bit lines connected to each of the devices located within the array; a series of array select and data lines associated with said set of arrays, said series comprising two groups of select lines orthogonal to each other and two groups of data lines orthogonal to each other, each of said word and bit lines of each of said plurality of bistable devices being respectively connected to one select line and one data line in each of said two groups of select lines and data lines.

* * * * *